(12) United States Patent
Ogata et al.

(10) Patent No.: US 7,440,612 B2
(45) Date of Patent: Oct. 21, 2008

(54) IMAGE PROCESSING APPARATUS AND METHOD CAPABLE OF CORRECTING GRADATION OF IMAGE DATA

(75) Inventors: Masami Ogata, Kanagawa (JP); Takashi Tsuchiya, Tokyo (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 773 days.

(21) Appl. No.: 10/802,600

(22) Filed: Mar. 16, 2004

(65) Prior Publication Data

US 2004/0175054 A1 Sep. 9, 2004

Related U.S. Application Data

(62) Division of application No. 09/434,565, filed on Nov. 12, 1999, now abandoned.

(30) Foreign Application Priority Data

| Nov. 13, 1998 | (JP) | ................................ | 10-323051 |
| Nov. 18, 1998 | (JP) | ................................ | 10-327785 |
| Nov. 19, 1998 | (JP) | ................................ | 10-328909 |
| Nov. 19, 1998 | (JP) | ................................ | 10-328937 |

(51) Int. Cl.
*G06K 9/00* (2006.01)
*G06K 9/40* (2006.01)
*H04N 9/68* (2006.01)

(52) U.S. Cl. ...................................... 382/167; 382/274
(58) Field of Classification Search ................. 382/274, 382/167; 348/234
See application file for complete search history.

(56) References Cited

U.S. PATENT DOCUMENTS

| 5,170,249 | A | 12/1992 | Ohtsubo et al. |
| 5,517,333 | A | 5/1996 | Tamura et al. |
| 5,550,955 | A | 8/1996 | Morikawa |
| 5,661,575 | A | 8/1997 | Yamashita et al. |
| 6,101,217 | A | 8/2000 | Gut |
| 6,252,995 | B1 | 6/2001 | Takamori |

*Primary Examiner*—Wenpeng Chen
(74) *Attorney, Agent, or Firm*—Finnegan, Henderson, Farabow, Garrett & Dunner, L.L.P.

(57) ABSTRACT

The invention provides an image processing apparatus and an image processing method. An area to which image data belongs is discriminated, and a correction coefficient to be used for correction of a pixel value of the image data is produced based on a result of the discrimination. Then, the pixel value of the image data is corrected with the correction coefficient. The relationship in magnitude among pixel values in the same area is maintained because the same coefficient is used, but pixel values which belong to different areas can be varied or even reversed. This allows the gradation of an entire image to be corrected while preventing partial deterioration of the contrast.

26 Claims, 27 Drawing Sheets

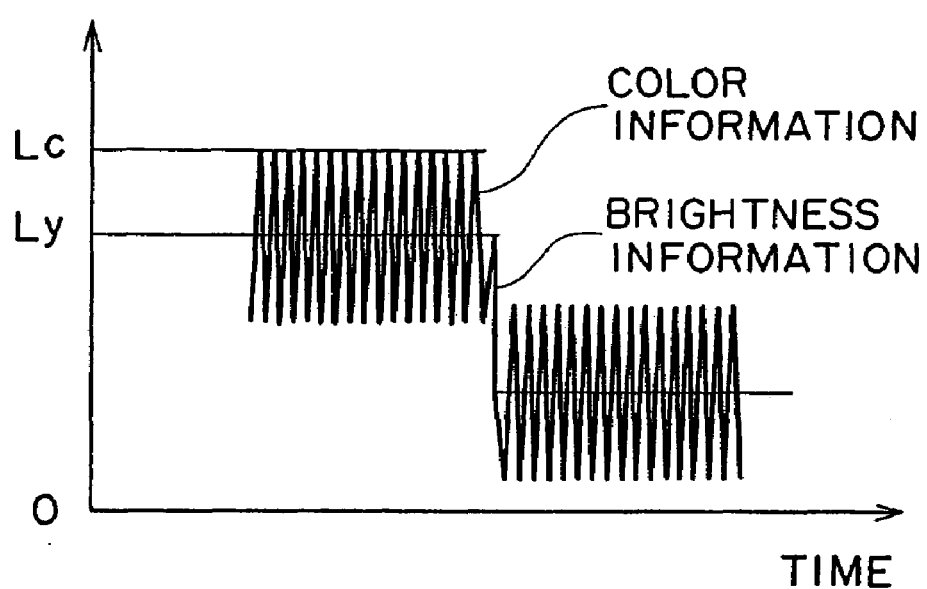

F I G. 14
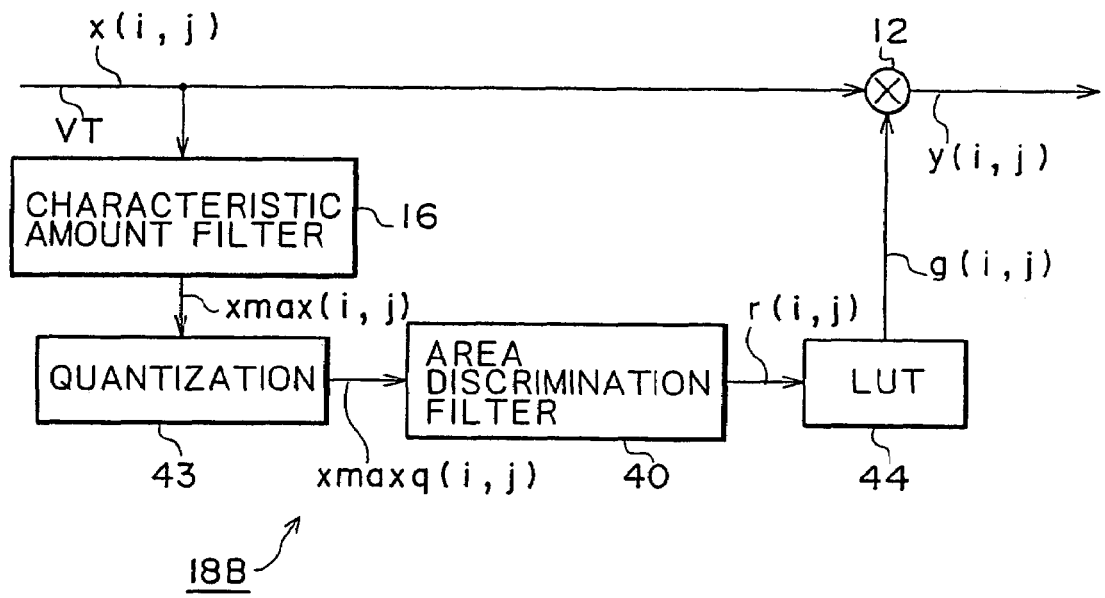
F I G. 15
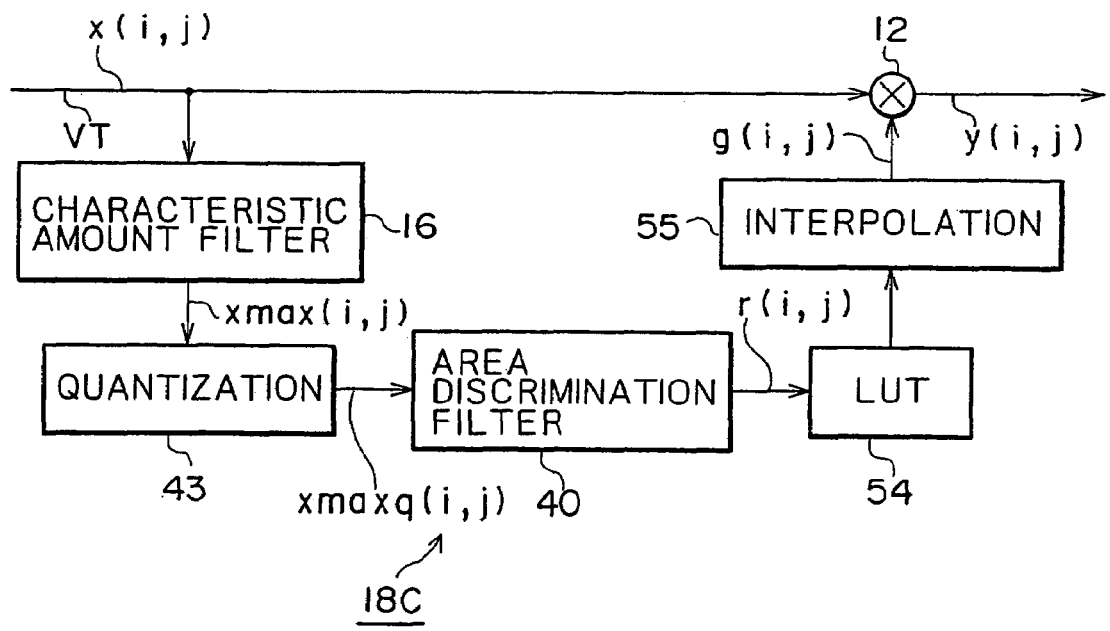

F I G. 23A
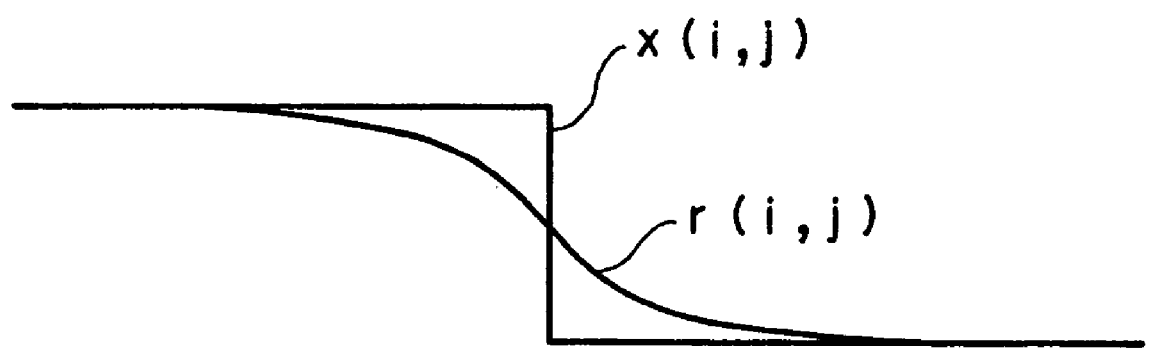
F I G. 23B
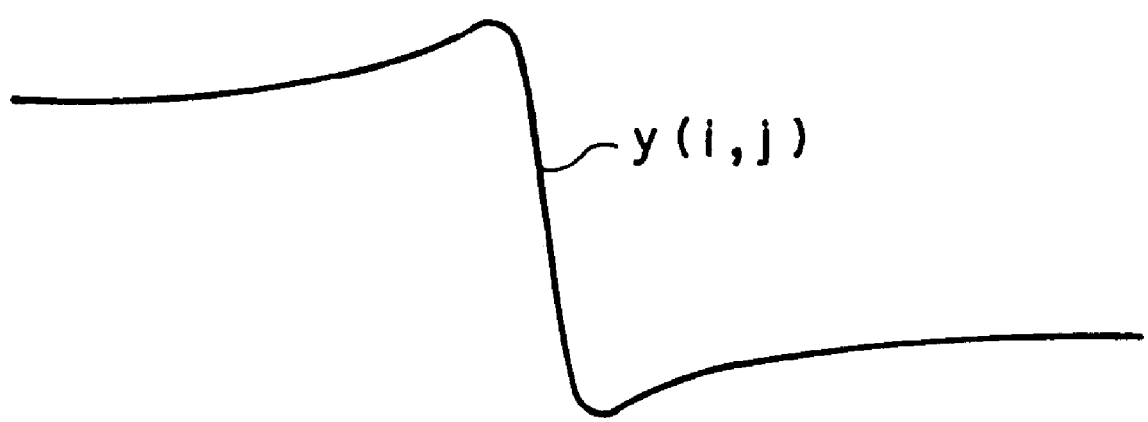

IMAGE PROCESSING APPARATUS AND METHOD CAPABLE OF CORRECTING GRADATION OF IMAGE DATA

This application is a divisional of U.S. patent application Ser. No. 09/434,565, filed Nov. 12, 1999 now abandoned.

BACKGROUND OF THE INVENTION

This invention relates to an image processing apparatus and an image processing method and can be applied to an image processing apparatus such as, for example, a television receiver, a video tape recorder, a television camera and a printer.

Conventionally, an image processing apparatus such as a television camera corrects the gradation of image data obtained from an image inputting apparatus such as an image pickup apparatus and outputs the image data of the corrected gradation.

FIG. 30 is a characteristic diagram showing an input/output characteristic of a signal processing circuit adapted to such gradation correction processing. A signal processing circuit of the type described decreases the gain when the input level L increases higher than a predetermined reference level Lk. Consequently, a signal processing circuit of the type described suppresses the signal level and outputs the signal of the suppressed signal level when the input level is higher than the reference level Lk. In this instance, the gradation is corrected sacrificing the contract at a portion of an image having a comparatively high signal level.

In the characteristic diagram of FIG. 30, the axis of abscissa represents the pixel value L which is the input level of image data while the axis of ordinate represents the pixel value T(L) which is the output level of the image data, and Lmax represents the maximum level which can be taken by any pixel of the input/output images. In the following description, a function indicative of an input/output function as represented by the characteristic curve of FIG. 30 is referred to as level conversion function.

FIG. 31 is a characteristic diagram showing an input/output characteristic of another signal processing circuit of a similar type. The signal processing circuit which uses the level conversion function illustrated in FIG. 31 decreases the gain when the input level L is lower than a first reference level Ls and when the input level L is higher than a second reference level Lb. Consequently, the signal processing circuit corrects the gradation sacrificing the contrast where the signal level is comparatively low and where the signal level is comparatively high with respect to an intermediate range of the input signal level.

On the other hand, in image processing and so forth wherein a computer is used, the gradation is corrected, for example, by histogram equalization.

The histogram equalization is a method of adaptively varying the level conversion function in response to the frequency distribution of a pixel value of an input image, and corrects the gradation by reducing the gradation at a portion where the frequency distribution of the pixel value is low.

Referring to FIG. 32, in processing of the histogram equalization, a cumulative frequency distribution C(L) by arithmetic processing of the following expression (1) is detected based on a frequency distribution H(L) which is an aggregate of the pixel number with reference to the pixel value L of the input image:

$$C(L) = \sum_{k=0}^{L} H(k) \qquad (1)$$

In the processing of the histogram equalization, the cumulative frequency distribution C(L) detected in this manner is normalized in accordance with the following expression (2) to define a level conversion function T(L), and the signal level of the input image is corrected in accordance with the level conversion function T(L).

$$T(L) = C(L)/F\max \times L\max \qquad (2)$$

where Fmax is the final value of the cumulative frequency distribution C(L), and Lmax is the maximum value of the input/output levels Such processing of correcting the gradation as described above is executed suitably in accordance with the necessity in order to suppress the dynamic range or for some otherobject when image data are transmitted over a transmission line, when image data are displayed on a display unit, when image data are stored into a storage device or in a like case.

In the correction processes of the gradation according to the conventional techniques described above, the entire gradation is corrected sacrificing the contrast at some portion of the input image. This is because, with any of the techniques, the level is converted with an input/output function having a monotone increasing property in order to prevent production of an unnatural image.

Accordingly, the conventional techniques have a problem in that an image obtained by processing finally has a partially reduced contrast.

SUMMARY OF THE INVENTION

It is an object of the present invention to provide an image processing apparatus and an image processing method by which the gradation can be corrected while effectively preventing a finally obtained image from suffering from partial reduction in contrast.

In order to attain the object described above, according to the present invention, an area to which image data belongs is discriminated, for example, with reference to a low frequency component of a pixel value, and the signal level of the image data is corrected based on a result of the discrimination to allow the gradation to be corrected while preventing partial deterioration in contrast effectively.

More particularly, in an image processing apparatus and an image processing method according to an aspect of the present invention, an area to which image data belongs is discriminated, and a correction coefficient to be used for correction of a pixel value of the image data is produced based on a result of the discrimination, and then the pixel value of the image data is corrected with the correction coefficient.

Where an area to which image data belongs is discriminated and a correction coefficient to be used for correction of a pixel value of the image data is produced based on a result of the discrimination and then the pixel value of the image data is corrected with the correction coefficient, the pixel values in the same area can be corrected with the same coefficient to maintain the relationship in magnitude among the pixel values in the area, but the relationship in magnitude between pixel values which belong to different areas can be varied, for example, reversed. Consequently, the gradation of the entire image can be corrected while preventing partial deterioration of the contrast.

In an image processing apparatus and an image processing method according to another aspect of the present invention, image data is demultiplexed into brightness data and color data, and an area to which the brightness data belongs is discriminated, and then a correction coefficient to be used for correction of a pixel value of the brightness data is produced based on a result of the discrimination, whereafter the pixel values of the brightness data and the color data are corrected with the correction coefficient.

Where image data is demultiplexed into brightness data and color data and an area to which the brightness data belongs is discriminated and then a correction coefficient to be used for correction of a pixel value of the brightness data is produced based on a result of the discrimination, whereafter the pixel values of the brightness data and the color data are corrected with the correction coefficient, the pixel values in the same area can be corrected with the same coefficient to maintain the relationship in magnitude among the pixel values in the area, but the relationship in magnitude between pixel values which belong to different areas can be varied, for example, reversed. Consequently, the gradation of the entire image can be corrected while preventing partial deterioration of the contrast.

In an image processing apparatus and an image processing method according to a further aspect of the present invention, a characteristic amount representative of a characteristic of a predetermined range neighboring to each pixel is successively detected, and an area to which the image data belongs is discriminated based on the characteristic amount, and then a correction coefficient is produced based on a result of the discrimination and used for correction of the pixel value of the image data.

Where an area to which image data belongs is discriminated and a correction coefficient is produced based on a result of the discrimination and used for correction of the pixel value of the image data, the pixel values in the same area can be corrected with the same coefficient to maintain the relationship in magnitude among the pixel values in the area, but the relationship in magnitude between pixel values which belong to different areas can be varied, for example, reversed. Consequently, the gradation of the entire image can be corrected while preventing partial deterioration of the contrast. In this instance, where a characteristic amount representative of a characteristic of a predetermined range neighboring to each pixel is successively detected and an area to which the image data belongs is discriminated based on the characteristic amount, for example, when an output signal of a solid-state image pickup device of the single plate type is processed directly as a processing object, the gradation can be corrected without any loss of color information superposed on the brightness signal.

Further, in an image processing apparatus and an image processing method according to a still further aspect of the present invention, an area to which image data belongs is discriminated and a discrimination result is outputted, and a correction coefficient to be used for correction of the pixel value of the image data is outputted based on the discrimination result and the pixel value of the image data is corrected with the correction coefficient, the resolution of the correction coefficient being switched in response to the pixel value of the image data.

Where an area to which image data belongs is discriminated and a discrimination result is outputted and then a correction coefficient to be used for correction of the pixel value of the image data is outputted based on a result of the discrimination result and the pixel value of the image data is corrected with the correction coefficient, the pixel values in the same area can be corrected with the same coefficient to maintain the relationship in magnitude among the pixel values in the area, but the relationship in magnitude between pixel values which belong to different areas can be varied, for example, reversed. Consequently, the gradation of the entire image can be corrected while preventing partial deterioration of the contrast.

Upon such correction of the gradation, the contrast between different areas depends upon the gradient of a level conversion function which is an image data input/output characteristic of correction means or correction processing, and as the spatial resolution of the discrimination result increases, the influence of the level conversion function upon the result of the gradation correction increases. Accordingly, when the pixel value corresponds to a portion of the level conversion function at which the gradient is small, if the resolution of the correction coefficient is increased, then even if, for example, the level conversion function does not keep a monotone increasing property, the influence of the level conversion function can be reduced to reduce an unnatural variation of the contrast with respect to a neighboring area. Consequently, also between adjacent areas, a natural contrast can be assured.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a plan view showing a color filter;

FIG. 3 is a signal waveform diagram illustrating a result of image pickup when the color filter of FIG. 2 is used;

FIG. 14 is a block diagram showing a gradation correction circuit applied to a fifth modification to the television camera of the first embodiment of the present invention;

FIG. 15 is a block diagram showing a gradation correction circuit applied to a sixth modification to the television camera of the first embodiment of the present invention;

FIGS. 23(A) and 23(B) are signal waveform diagrams illustrating operation of the gradation correction circuit of FIG. 22;

DETAILED DESCRIPTION OF THE PREFERRED EMBODIMENTS

Hereinafter, the preferred embodiments of the present invention will be described with reference to the accompanied drawings, as needed.

First Embodiment

Figure 1:
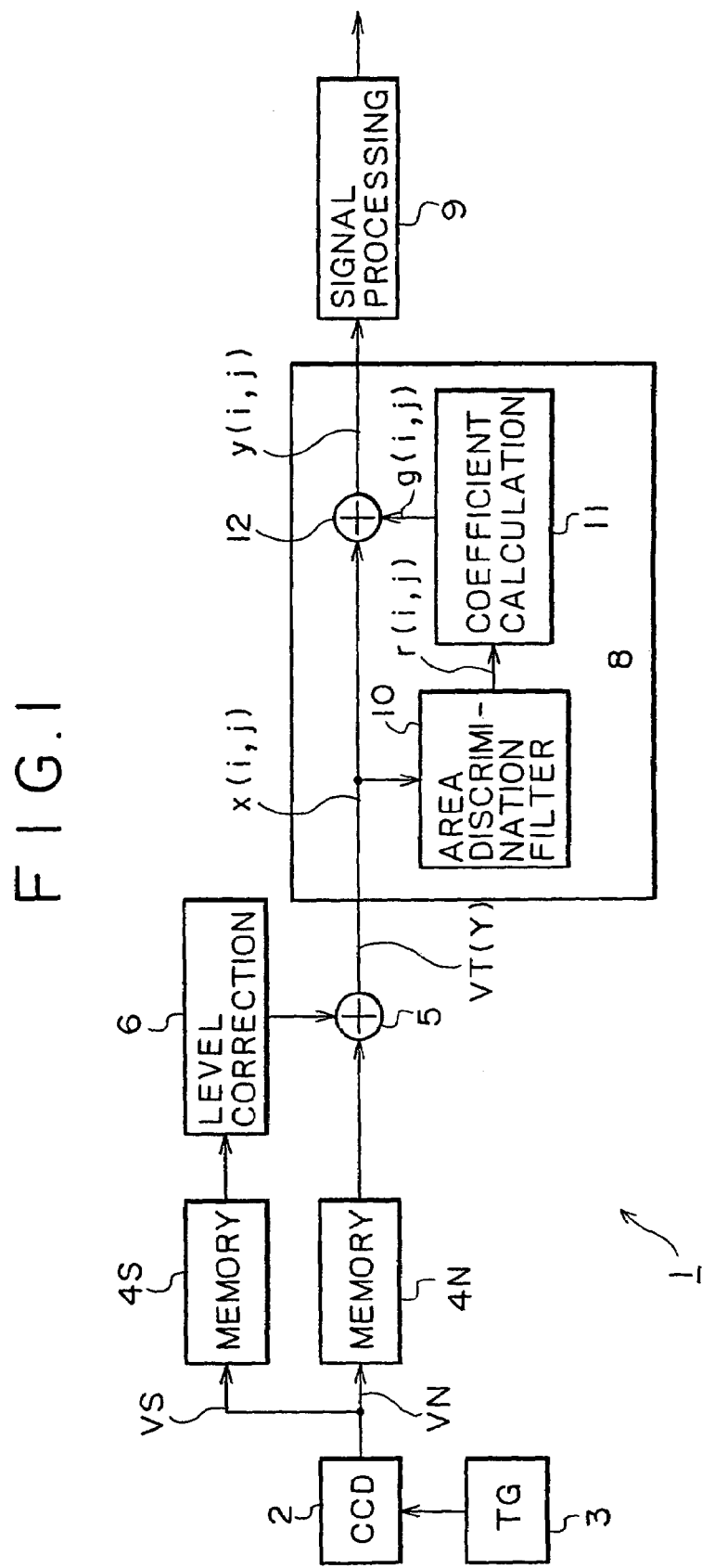
FIG. 1 is a block diagram showing a television camera according to a first embodiment of the present invention.

Referring to FIG. 1, there is shown in block diagram a television camera according to a first preferred embodiment of the present invention. The television camera is generally denoted at 1 and includes a CCD solid-state image pickup device 2 driven by a timing generator (TG) 3.

FIG. 2 is a front elevational view showing, in an enlarged scale, an image pickup face of the CCD solid-state image pickup device 2. Referring to FIG. 2, a color filter of a diced arrangement of complementary colors is disposed on the image pickup face of the CCD solid-state image pickup device 2. More particularly, in the CCD solid-state image pickup device 2, color filters of yellow (Ye) and cyan (Cy) are repeated in a unit of a pixel to form an odd-numbered line while color filters of magenta (Mg) and green (G) are repeated in a unit of a pixel to form an even-numbered line.

Consequently, the CCD solid-state image pickup device 2 outputs, by means of a correlation double sampling circuit usually added to an image pickup device of the type mentioned, an image pickup result wherein amplitude modulated color signals are successively superposed time-divisionally on a brightness signal as seen in FIG. 3.

In order to output such an image pickup result as described above, the CCD solid-state image pickup device 2 obtains an image pickup result in a period of 1/60 second based on a charge accumulation time set by a user and outputs the image pickup result as an image pickup result VN by normal exposure. Further, the CCD solid-state image pickup device 2 obtains, within a vertical blanking period of the image pickup result VN by normal exposure, an image pickup result by another charge accumulation time which is shorter than the charge accumulation time by normal exposure, and outputs the image pickup result as an image pickup result VS by short time exposure.

Figure 4A:
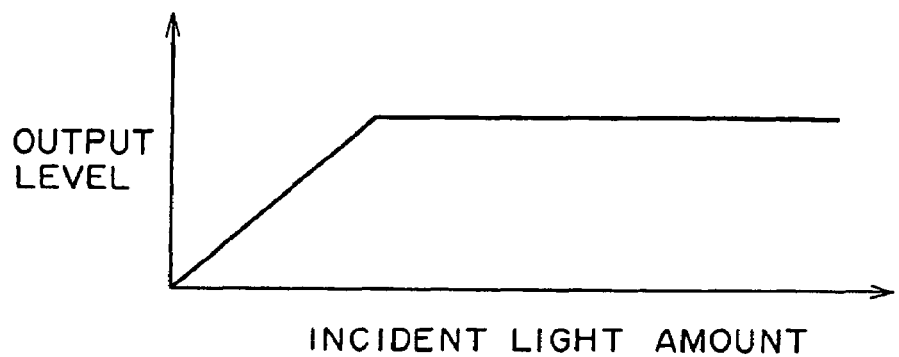
FIGS. 4(A) to 4(C) are characteristic diagrams illustrating processing of an image pickup result by the television camera of FIG. 1.
Figure 4B:
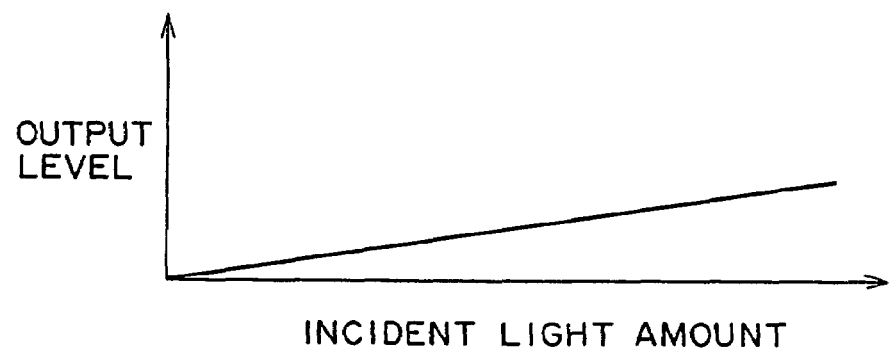

Consequently, when the incoming light amount to the CCD solid-state image pickup device 2 is higher than a predetermined level, the image pickup result VN by normal exposure which indicates that the output level is saturated as seen in FIG. 4(A) and the image pickup result VS by short time exposure which indicates that the output level is not saturated as seen in FIG. 4(B) because the charge accumulation time is shorter than that by normal exposure are output in a set from the CCD solid-state image pickup device 2.

Referring back to FIG. 1, the television camera 1 further includes a memory 4N which receives, through a correlation double sampling circuit, a defect correction circuit, a matrix arithmetic circuit, an analog to digital conversion circuit and other necessary circuits all not shown, the image pickup result VN by normal exposure in the form of color signals of red, blue and green obtained by the processing of the circuits mentioned, and temporarily holds and stores the image pickup result VN by normal exposure.

The television camera 1 further includes a memory 4S which similarly receives, through the correlation double sampling circuit, defect correction circuit, matrix arithmetic circuit, analog to digital conversion circuit and so forth all not shown, the image pickup result VS by shorter time exposure, and temporarily holds and stores the image pickup result VS by shorter time exposure.

An addition circuit 5 adds the image pickup result VN by normal exposure stored in the memory 4N and the image pickup result VS by shorter time exposure stored in the memory 4S to obtain an image pickup result VT which has a broad dynamic range and has a sufficient pixel value, and outputs the image pickup result VT. A level correction circuit 6 corrects a pixel value of the image pickup result VS by shorter time exposure outputted from the memory 4S so that the image pickup result VT from the addition circuit 5 may have a linearity sufficient for practical use, and outputs the corrected pixel value.

Figure 4C:
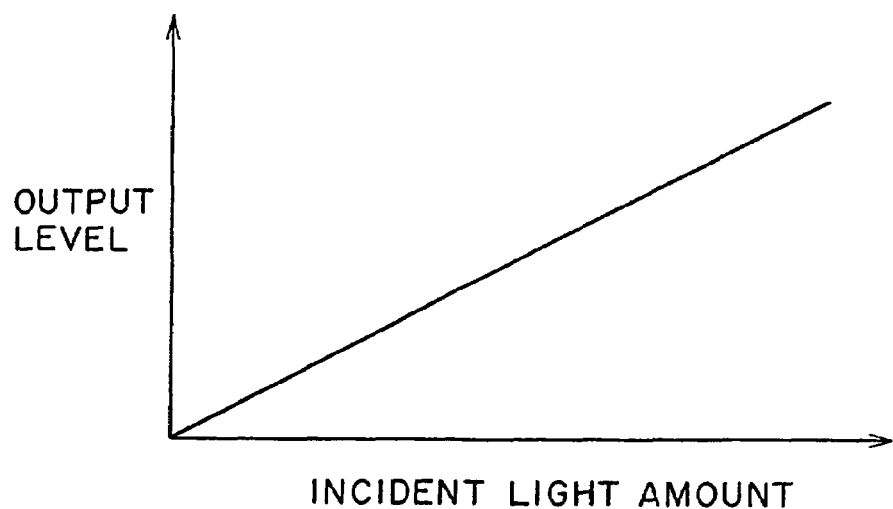

Consequently, the television camera 1 produces an image pickup result VT having a dynamic range significantly greater than that obtained by a conventional television camera as seen in FIG. 4(C).

A gradation correction circuit 8 corrects the pixel value of the image pickup result VT to correct the gradation of the image pickup result VT and outputs the image pickup result VT of the corrected gradation. A signal processing circuit 9 following the gradation correction circuit 8 executes various signal processes necessary for the television camera to obtain an image pickup result and outputs the image pickup result to an external apparatus. Thereupon, the image pickup result is suppressed uniformly to suppress the dynamic range of the image pickup result so as to conform with the external apparatus, and the resulting image pickup result is outputted to the external apparatus.

In the processing, the gradation correction circuit 8 executes arithmetic processing of the following expression (3) in advance to produce a brightness signal Y from the image pickup result VT including color signals R, G and B, corrects the gradations of the color signals R, G and B with reference to the brightness signal Y, and outputs resulting color signals R, G and B.

$$Y = 0.3R + 0.59G + 0.11B \tag{3}$$

The gradation correction circuit 8 includes an area discrimination filter 10 which discriminates an area to which image data of the brightness signal Y belongs and outputs a result of the discrimination. Thereupon, the area discrimination filter 10 detects an average brightness level which is an average value of pixel values as a characteristic amount which indicates a characteristic of a predetermined range neighboring to the image data, discriminates to which average brightness level area the image data belongs, and outputs an average value which is the average brightness level as a discrimination result.

Figure 5:
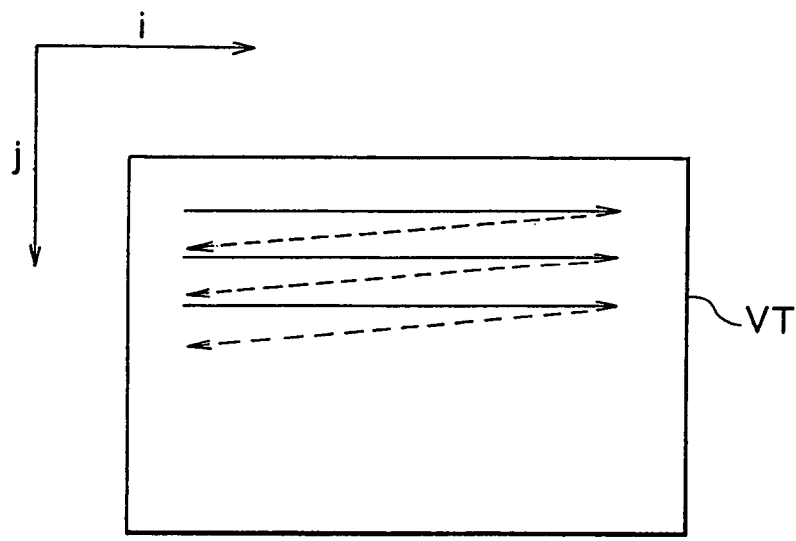
FIG. 5 is a schematic view illustrating an arrangement of pixel values by the television camera of FIG. 1.

In particular, the area discrimination filter 10 is a two-dimensional low-pass filter and detects, from each of pixel values x(i, j) of the brightness signal Y of the image pickup result VT successively inputted thereto in the order of raster scanning, a low frequency component r(i, j) represented by the following expression (4), and outputs the low frequency component r(i, j) as a discrimination result.

$$r(i, j) = \sum_{dj=-\frac{N}{2}}^{\frac{N}{2}} \sum_{di=-\frac{M}{2}}^{\frac{M}{2}} \frac{x(i+di, j+dj)}{M \times N} \tag{4}$$

where N and M are constants representative of the magnitude of the neighboring area for which an average value is calculated, and as seen from FIG. 5, in the television camera 1 of the present embodiment, in regard to the image pickup result VT inputted in the order of raster scanning, the horizontal direction is indicated by the subscript i while the vertical direction is indicated by the subscript j. Consequently, the area discrimination filter 10 removes fine image structures from within an image according to the image pickup result VT thereby to extract an area in which the pixel values are comparatively flat. It is to be noted that, since the area discrimination filter 10 is provided in order to perform such processing as just described, preferably it has a comparatively narrow bandwidth.

Figure 6:
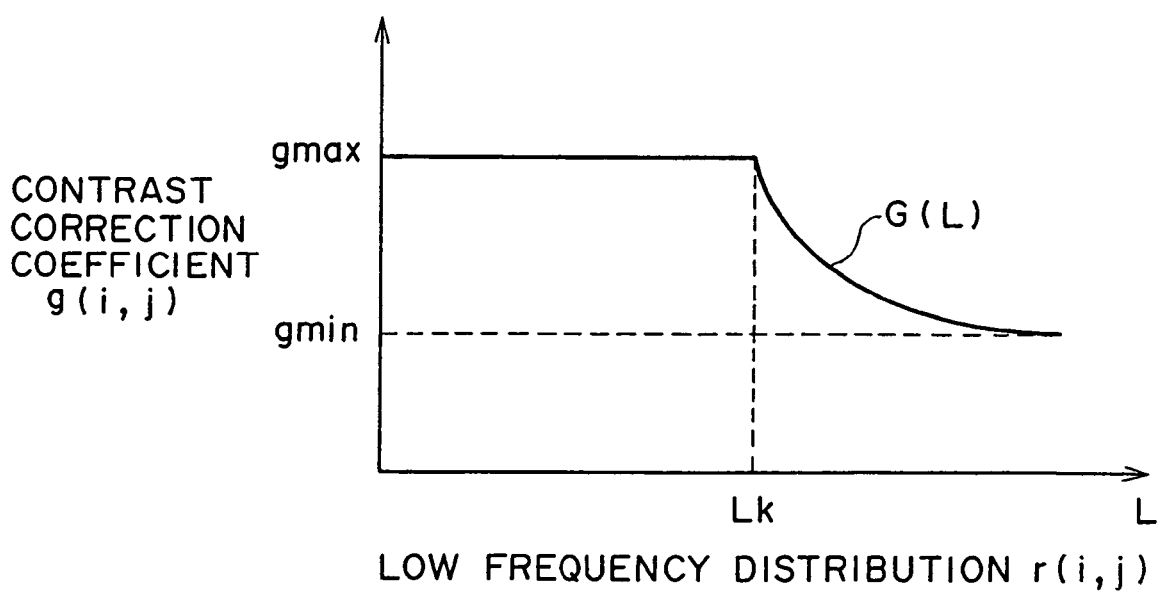
FIG. 6 is a characteristic diagram illustrating a contrast correction coefficient g(i, j)

Referring back again to FIG. 1, a coefficient calculation circuit 11 of the gradation correction circuit 8 produces a contrast correction coefficient g(i, j) using such a coefficient calculation function G as, for example, illustrated in FIG. 6 in response to the signal level of the low frequency component r(i, j). The coefficient calculation function G here is a function obtained by arithmetic processing of, for example, the level conversion function T(L) described hereinabove with reference to FIG. 30 in accordance with the following expression (5):

$$G(L) = T(L)/L \tag{5}$$

The coefficient calculation circuit 11 thus produces a contrast correction coefficient g(i, j) by arithmetic processing of the following expression (6):

$$g(i, j) = G(r(i, j)) \tag{6}$$

Thus, when the signal level of the low frequency component r(i, j) which is an input level is in an area lower than a predetermined reference level Lk, the coefficient calculation circuit 11 outputs a contrast correction coefficient g(i, j) of a fixed value gmax higher than 1, but when the signal level of the f(i, j) is in another area equal to or higher than the reference level Lk, the coefficient calculation circuit 11 output a contrast correction coefficient g(i, j) which gradually decreases to a value gmin in response to the signal level of the low frequency component r(i, j).

A multiplication circuit 12 of the gradation correction circuit 8 multiplies the contrast correction coefficient g(i, j) produced in this manner by the corresponding pixel value x(i, j) of the image pickup result VT (in this instance, such multiplication is processing for each color signal) to correct the signal level of the image pickup result VT with the contrast correction coefficient g(i, j) and outputs the image pickup result VT of the corrected signal level.

Operation of the First Embodiment

In the television camera 1 having the construction described above with reference to FIG. 1, the CCD solid-state image pickup device 2 alternately outputs an image pickup result VN (FIG. 4(A)) by normal exposure according to a charge accumulation time set by a user and another image pickup result VS (FIG. 4(B)) by shorter time exposure according to a shorter charge accumulation time. The image pickup results VN and VS are stored into the memories 4N and 4S, respectively. In the television camera 1, the two image pickup results VN and VS are composed by the level correction circuit 6 and the addition circuit 5 so that an image pickup result VT (FIG. 4(C)) of a dynamic range having significantly greater than that by a conventional television camera is produced.

A brightness signal Y is produced from the image pickup result VT, and an average value of pixel values which is a characteristic amount indicative of a characteristic of a predetermined neighboring range to each input image data is detected by the area discrimination filter 10 of the gradation correction circuit 8 thereby to produce a discrimination result which indicates an area to which the input image data belongs. More particularly, the area discrimination filter 10 detects a low frequency component r(i, j) which is an average value of pixel values thereby to remove fine structures in the image and extract an area in which the pixel values are comparatively flat. The low frequency component r(i, j) is outputted as a discrimination result.

From the image pickup result VT, a contrast correction coefficient g(i, j) is produced in response to the signal level of the low frequency component r(i, j) by the coefficient calculation circuit 11, and the pixel value is corrected with the contrast correction coefficient g(i, j) by the multiplication circuit 12 thereby to correct the pixel value with a gain according to each area with reference to the low frequency component r(i, j) by the coefficient calculation circuit 11. The thus corrected pixel value is outputted from the coefficient calculation circuit 11.

Consequently, pixel values in an area of the image pickup result VT in which the signal levels of the low frequency components r(i, j) are equal are corrected with an equal gain, but pixel values in areas in which the signal levels of the low frequency components r(i, j) are different can be made nearer to each other in accordance with a setting of the level conversion function T(L), or depending upon a case, the relationship between pixel values in regard to the magnitude can possibly be reversed. By the processing, the contrast in each area can be increased naturally with respect to the gradation of the entire image, and the gradation of the entire image can be corrected while preventing a partial reduction of the contrast effectively.

Figure 7A:
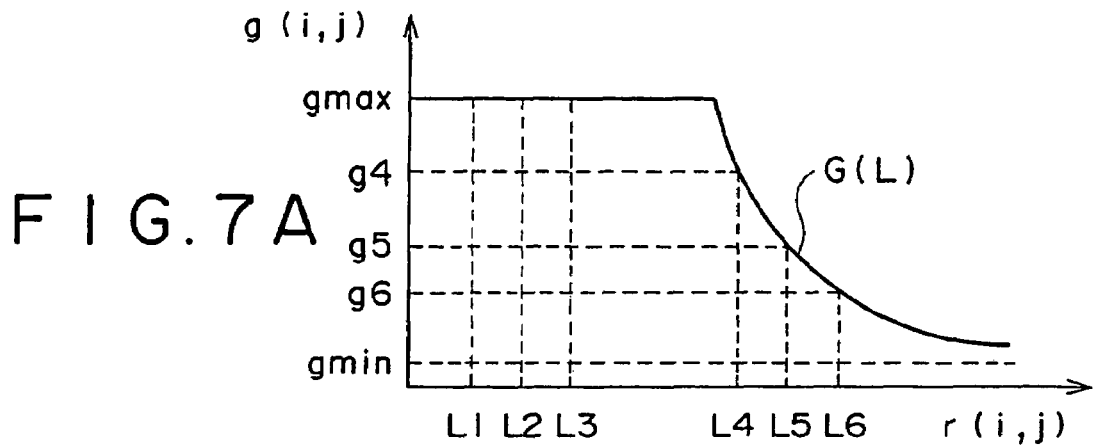
FIGS. 7(A) to 7(D) are signal waveform diagrams illustrating processing of a gradation correction circuit of the television camera of FIG. 1.
Figure 7B:
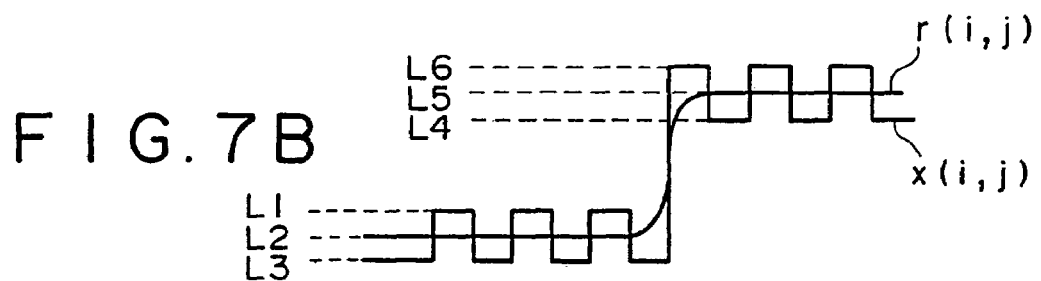
Figure 7C:
Figure 30:
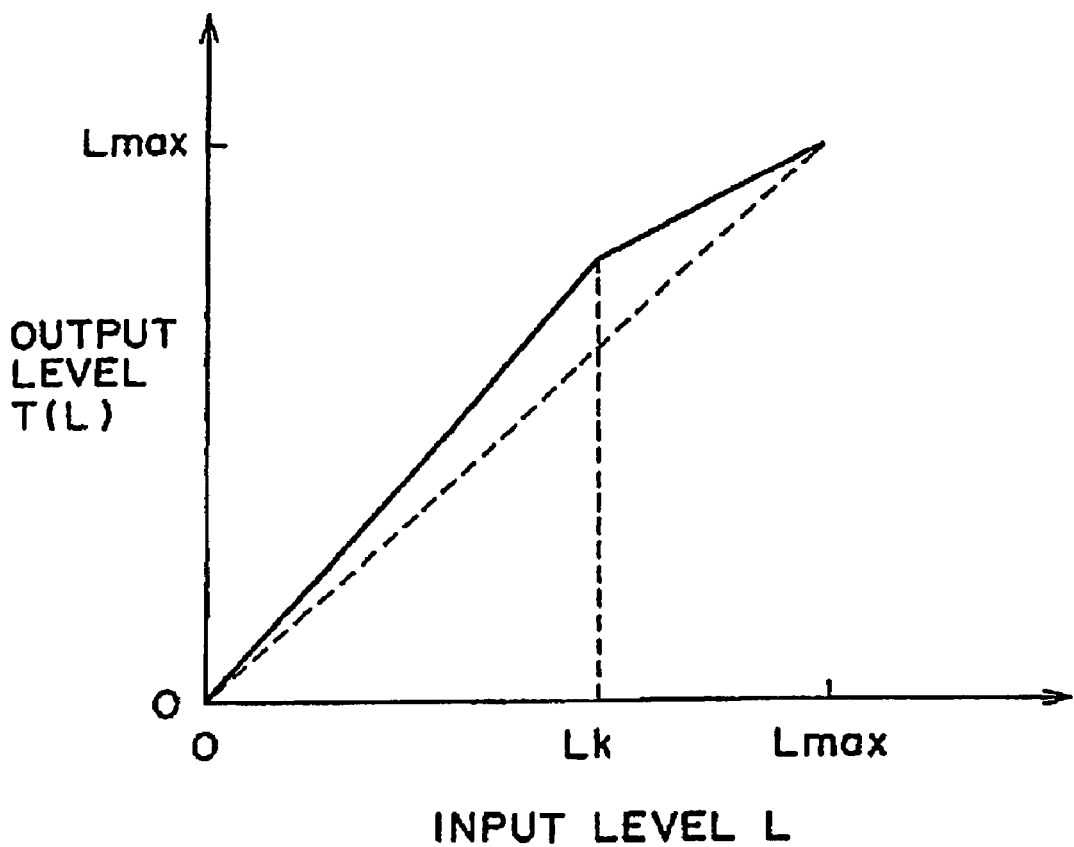
FIG. 30 is a characteristic diagram illustrating a level conversion function applied to conventional suppression processing for a dynamic range.

In particular, when the pixel value x(i, j) of the image pickup result VT is pulsated with a frequency higher than the cutoff frequency of the low-pass filter 10 and the dc level of the pixel value x(i, j) rises suddenly (FIG. 7(B)) and besides the variation of the low frequency component r(i, j) corresponding to the sudden variation of the dc level crosses an inflection point of a coefficient calculation function G(L) (FIG. 7(A)), where the conventional level conversion function described hereinabove with reference to FIG. 30 is applied, the contrast is suppressed in a portion where the pixel value x(i, j) is high (FIG. 7(C)).

Figure 7D:
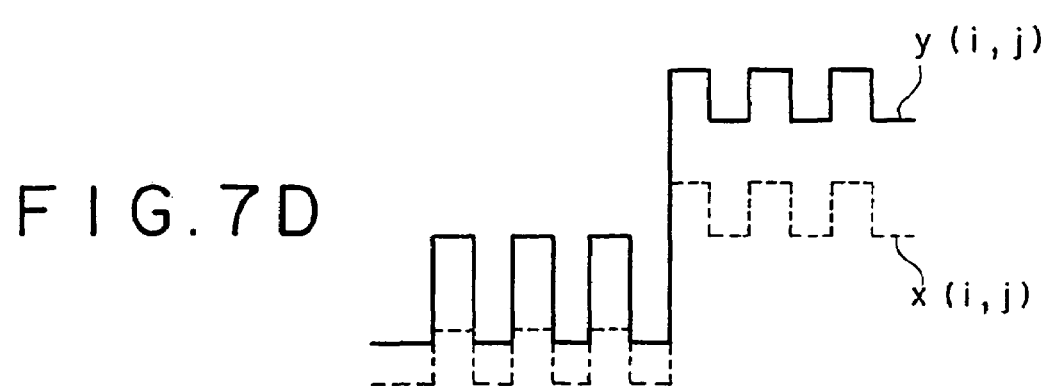

However, with the television camera 1 of the present embodiment, before and after the signal level of the low frequency component r(i, j) rises suddenly, the pixel value x(i, j) is corrected with a gain corresponding to the signal level of the low frequency component r(i, j), and the signal level is corrected in accordance with the setting of the coefficient calculation function G(L). In this instance, where the pixel value x(i, j) is low, it is corrected with the gain gmax based on an average value level L2 between a peak value L3 and a bottom value L1. Consequently, in the low level area, a contrast substantially equal to that obtained by the conventional method can be obtained (FIG. 7(D)).

In contrast, in a high level side area, the pixel value x(i, j) is corrected with a gain g5 of an average value level L5 between a peak value L6 and a bottom value L4. In this instance, since the pixel values are corrected with a gain whose peak value L6 and bottom value L4 are uniform, the contrast between the peak value L6 and the bottom value L4 is amplified with the gain g5.

Consequently, the television camera 1 of the present embodiment does not exhibit a great variation in gradation when an image is viewed as a whole, but can expand, when a pulsation is viewed microscopically, a great pulsation by an image pickup result VT of an input image.

Figure 8A:
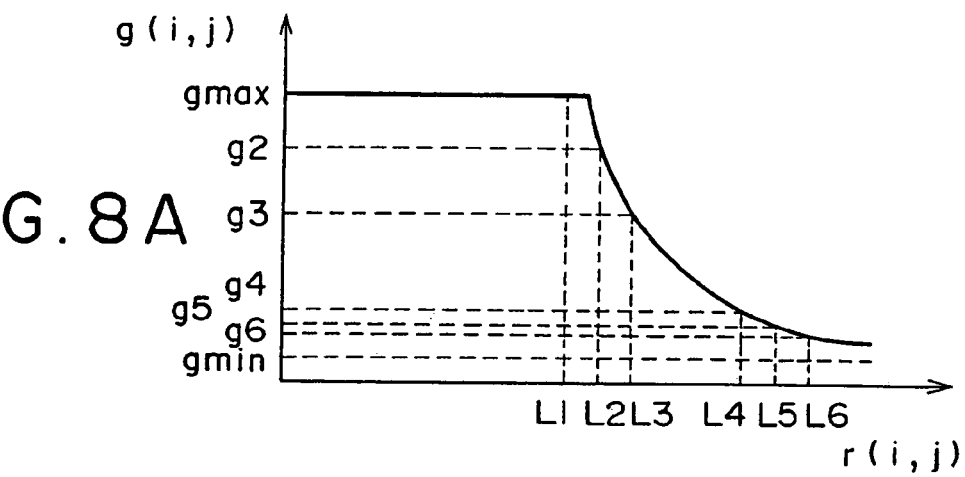
FIGS. 8(A) to 8(D) are signal waveform diagrams illustrating processing of the gradation correction circuit when the input level is different from that in the case of FIGS. 7(A) to 7(D)
Figure 8B:
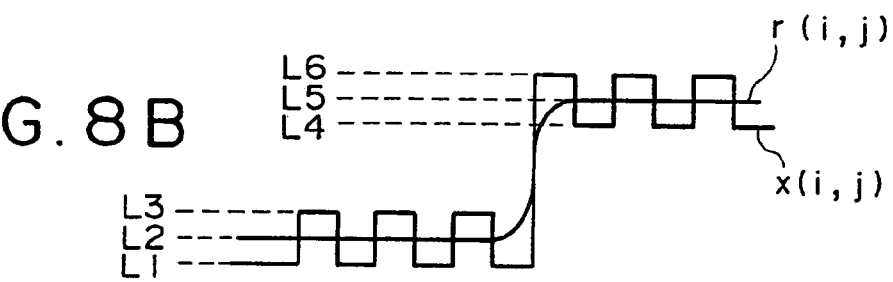
Figure 8C:
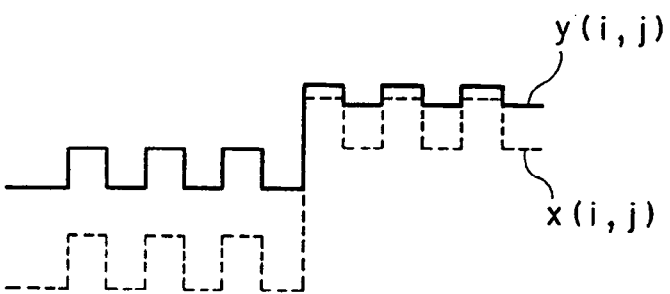
Figure 8D:
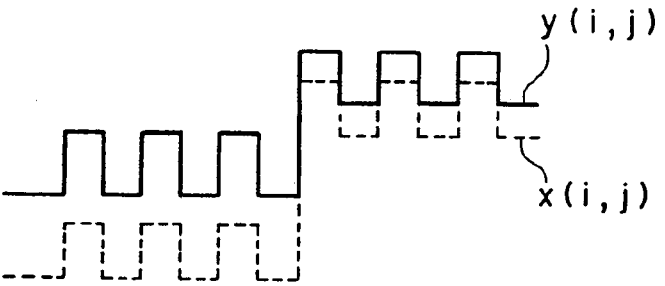

When the pixel value x(i, j) is pulsated similarly and the dc level of it rises suddenly (FIG. 8(B)) and besides the pulsation of the pixel value x(i, j) is displaced to the high level side from an inflection point of the coefficient calculation function G(L) (FIG. 8(A)), where the conventional level conversion function described hereinabove with reference to FIG. 30 is applied, the contrast is suppressed with regard to all pixel values x(i, j) (FIG. 8(C)).

Also in this instance, however, on the higher level side and the lower level side, the pixel values are corrected with the gains g2 and g3 corresponding to the average levels L2 and L5, respectively, and although the gradation when the image is viewed entirely does not exhibit a great variation, when a pulsation is viewed microscopically, a great pulsation of the image pickup result VT of the input image can be expanded.

Effects of the First Embodiment

With the television camera 1 having the construction described above, since an area to which each image data belongs is discriminated and a correction coefficient to be used for correction of the pixel value of the image data is produced based on a result of the discrimination and then the pixel value of the image data is corrected with the correction coefficient, while the relationship in magnitude among pixel values in the same area is maintained because the same coefficient is used, pixel values which belong to different areas can be made nearer to each other in accordance with the necessity, and in an extreme case, the relationship can be reversed. Consequently, the contrast in each area can be expanded within a predetermined level range, and the gradation of the entire image can be corrected while preventing a partial reduction of the contrast.

Further, where a low frequency component obtained using low-pass filters is used as a characteristic amount and the pixel value is corrected with reference to the low frequency component, the gradation of the entire image can be corrected while preventing a partial reduction of the contrast with a simple construction.

First Modification to the First Embodiment

Figure 9:
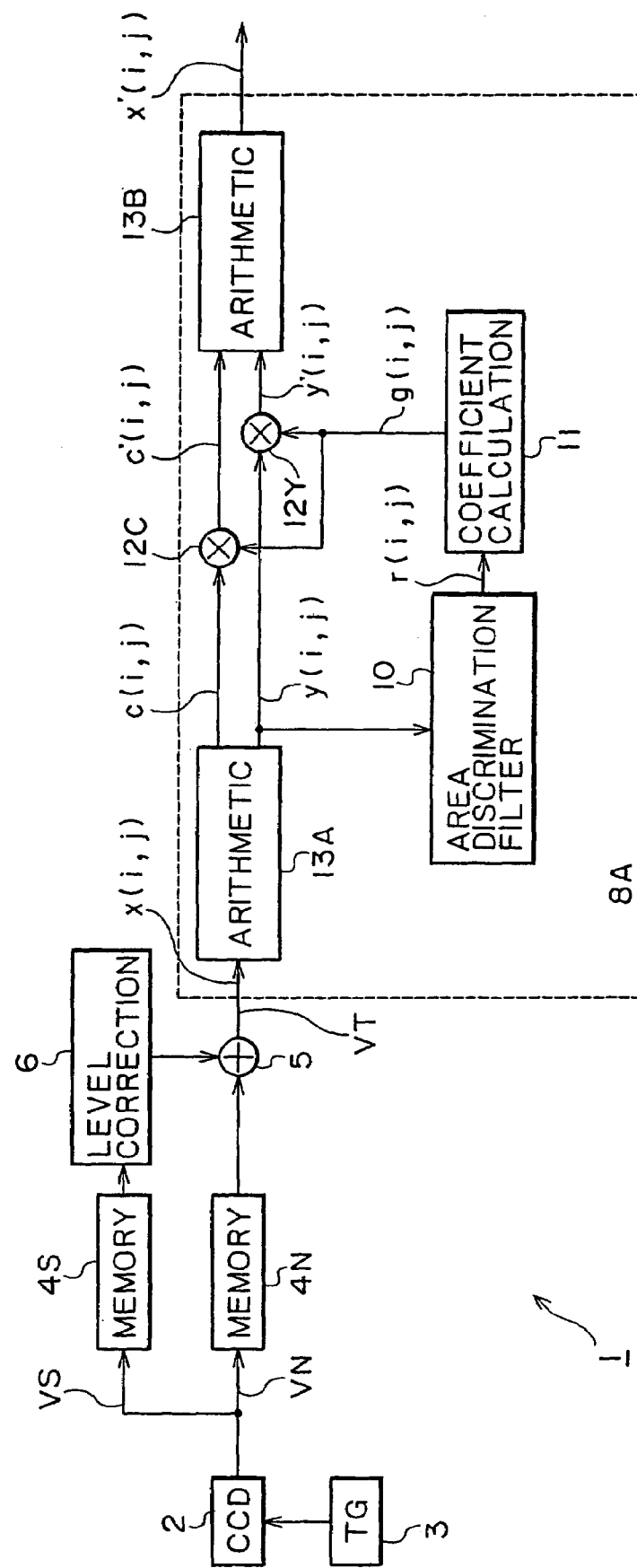
FIG. 9 is a block diagram showing a first modification to the television camera of the first embodiment of the present invention.

A first modification to the television camera 1 of the first embodiment is shown in FIG. 9. The modified television camera 1 is different from the television camera 1 of the first embodiment described hereinabove with reference to FIG. 1 in that it includes a gradation correction circuit 8A in place of the gradation correction circuit 8.

The gradation correction circuit 8A includes a pair of arithmetic circuits 13A and 13B, an area discrimination filter 10, a coefficient calculation circuit 11, and a pair of multiplication circuits 12C and 12Y. The area discrimination filter 10 and coefficient calculation circuit 11 are similar to those of the television camera 1 described hereinabove with reference to FIG. 1, and overlapping description of them is omitted here to avoid redundancy.

The arithmetic circuit 13A receives an image pickup result VT (x(i, j)) as an input thereto from the addition circuit 5 and demultiplexes the image pickup result VT (x(i, j)) into brightness data and color data. In particular, the arithmetic circuit 13A is formed from one-dimensional low-pass filters and executes arithmetic processing of the following expressions (7) to produce brightness data y(i, j) and color data c(i, j):

$$-y(i,j)=LPFy(x(i,j))$$

$$c(i,j)=LPFc(vi \times x(i,j))$$

$$vi=1 \ldots i=\text{even}$$

$$vi=-1 \ldots i=\text{odd} \qquad (7)$$

where LPFy and LPFc represent characteristics of the one dimensional filters. Also in this instance, in regard to the image pickup result VT inputted in the order of raster scanning, the horizontal direction is indicated by the subscript i while the vertical direction is indicated by the subscript j as seen in FIG. 5.

The area discrimination filter 10 discriminates an area to which each brightness data y(i, j) demultiplexed in this manner belongs, and outputs a result of the discrimination. In this instance, the area discrimination filter 10 detects an average brightness level which is an average value of brightness data y(i, j) as a characteristic amount representative of a predetermined range neighboring to the brightness data y(i, j) and outputs the average brightness level as a discrimination result.

In particular, the area discrimination filter 10 is a two-dimensional low-pass filter and detects, for each brightness data y(i, j) of brightness data successively inputted thereto in the order of raster scanning, a low frequency component r(i, j) represented by the following expression (8) and outputs the low frequency component r(i, j) as a discrimination result.

$$r(i, j) = \sum_{dj=-\frac{N}{2}}^{\frac{N}{2}} \sum_{di=-\frac{M}{2}}^{\frac{M}{2}} \frac{y(i + di, j + dj)}{M \times N} \quad (8)$$

where N and M are constants representative of the magnitude of the neighboring area for calculation of an average value. Thus, the area discrimination filter 10 removes fine structures from within the image based the image pickup result VT to extract an area in which the pixel values are comparatively flat. It is to be noted that, since the area discrimination filter 10 is provided in order to perform such processing as just described, preferably it has a comparatively narrow bandwidth.

In addition, the coefficient calculation 11 is similar to that of the television camera 1 described above with reference to FIG. 1.

The multiplication circuit 12Y multiplies the contrast correction coefficient g(i, j) produced in this manner by the corresponding brightness data y(i j) to correct the signal level of the image pickup result VT based on the brightness data with the contrast correction coefficient g(i, j) and outputs the image pickup result VT of the corrected signal level.

The multiplication circuit 12C similarly multiplies the contrast correction coefficient g(i, j) by the corresponding color data c(i, j) to correct the signal level of the image pickup result VT based on the color data with the contrast correction coefficient g(i, j) and outputs the image pickup result VT of the corrected signal level.

The arithmetic circuit 13B executes arithmetic processing of the following expression (9) to convert brightness data y'(i, j) and color data c'(i, j), whose gradations have been corrected by such signal level correction as described above, into original image data x'(i, j) and outputs the original image data x'(i, j).

$$x'(i, j) = y'(i, j) + Vic'(i, j) \quad (9)$$

In the television camera 1 having the construction described above, the image pickup result VT is demultiplexed into brightness data y(i, j) and color data c(i, j) by the arithmetic circuit 13A of the gradation correction circuit 8A. Further, a characteristic amount indicative of a characteristic of a predetermined range neighboring to each input image data is detected thereby to discriminate to which average brightness level area the brightness data belongs. More particularly, the area discrimination filter 10 detects a low frequency component r(i, j) which is an average brightness level of each brightness data y(i, j) thereby to remove fine structures in the image and extract areas in which the pixel values are comparatively flat. The area discrimination filter 10 outputs the low frequency component r(i, j) as a discrimination result.

From the image pickup result VT, a contrast correction coefficient g(i, j) is produced in response to the signal level of the low frequency component r(i, j) by the succeeding coefficient calculation circuit 11, and the pixel values of the brightness data y(i, j) and the color data c(i, j) are corrected with the contrast correction coefficient g(i, j) by the multiplication circuit 12Y and multiplication circuit 12C, respectively. Further, the image pickup result VT is returned into an image pickup result VT of the original form by the following arithmetic circuit 13B. Consequently, the pixel values corrected with gains according to the individual areas with reference to the low frequency component r(i, j) are outputted from the arithmetic circuit 13B.

With the television camera 1 having the construction described above, since an area to which each input image data belongs is discriminated and a correction coefficient is produced based on a result of the discrimination and then an image pickup result is corrected in accordance with the correction coefficient, while the relationship in magnitude among pixel values in the same area is maintained because the same coefficient is used, pixel values which belong to different areas can be made nearer to each other in accordance with the necessity, and in an extreme case, the relationship can be reversed. Consequently, the contrast in each area can be expanded within a predetermined level range, and the gradation of the entire image can be corrected while preventing a partial reduction of the contrast.

In this instance, if, after an image pickup result is demultiplexed into brightness data and color data, a correction coefficient is produced based on a discrimination result of an area to which the brightness data belongs and the brightness data and the color data are corrected with the correction coefficient to correct the gradation of the image pickup result, the gradation can be corrected without any unfamiliar feeling while preventing occurrence of color noise effectively.

Further, where a low frequency component obtained using low-pass filters is used as a characteristic amount and the pixel value is corrected with reference to the low frequency component, the gradation of the entire image can be corrected while preventing a partial reduction of the contrast with a simple construction.

Second Modification to the First Embodiment

Figure 10:
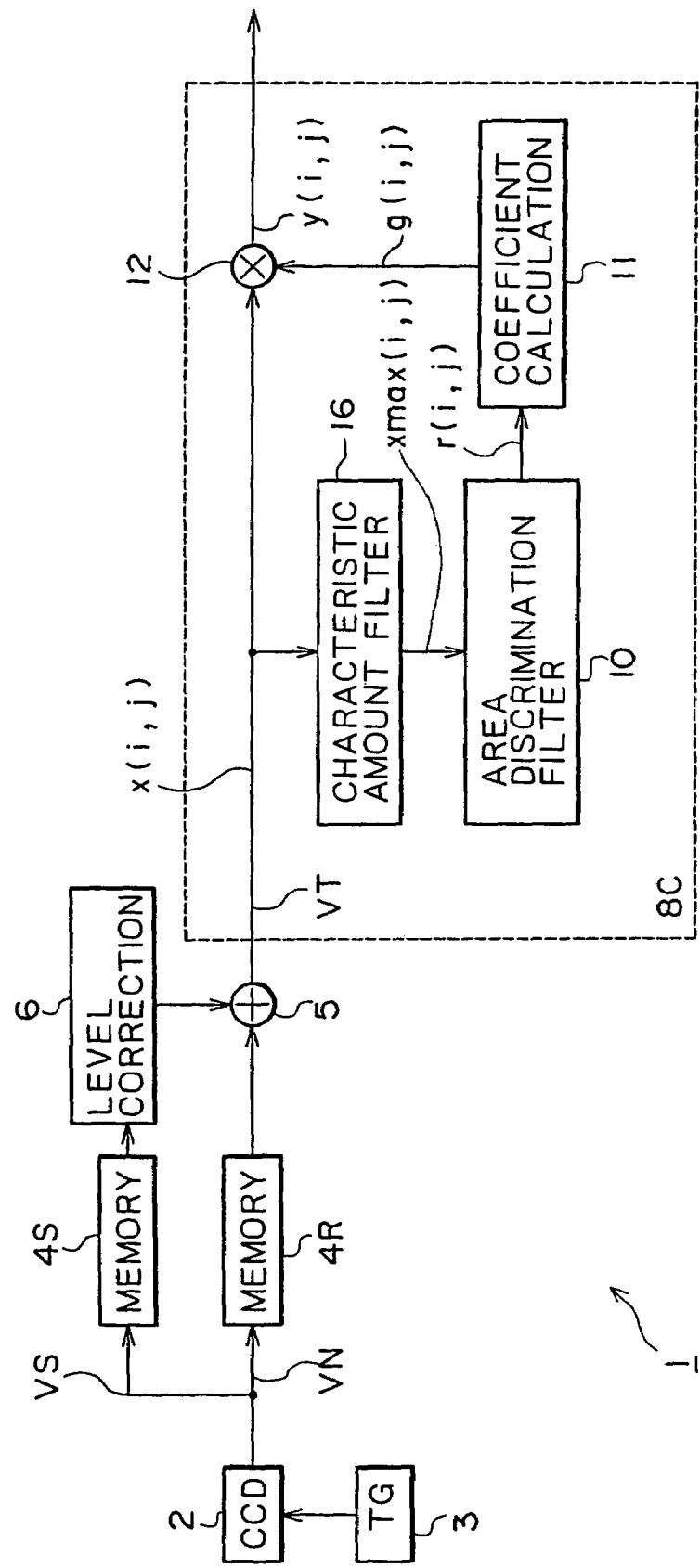
FIG. 10 is a block diagram showing a second modification to the television camera of the first embodiment of the present invention.

A second modification to the television camera 1 of the first embodiment is shown in FIG. 10. The modified television camera 1 is different from the television camera 1 of the first embodiment described hereinabove with reference to FIG. 1 in that it includes a gradation correction circuit 8C in place of the gradation correction circuit 8.

The gradation correction circuit 8C includes an area discrimination filter 10, a coefficient calculation circuit 11, a multiplication circuit 12, and a characteristic amount filter 16. The area discrimination filter 10, coefficient calculation circuit 11 and multiplication circuit 12 are similar to those of the gradation correction circuit 8 described above with reference to FIG. 1, and overlapping description of them is omitted here to avoid redundancy.

The characteristic amount filter 16 of the gradation correction circuit 8C in FIG. 10 detects a characteristic amount of each pixel value x(i, j) from an image pickup result VT inputted thereto from the addition circuit 5, and outputs the detected characteristic amount. The characteristic amount here indicates, for each of pixel values x(i, j) of the image pickup result VT successively inputted to the characteristic amount filter 16, a characteristic of a predetermined range around a pixel having the pixel value x(i, j). In the modified television camera 1, the characteristic amount filter 16 is formed from a two-dimensional maximum value filter, and detects, for each of the pixel values x(i, j) of the image pickup result VT successively inputted thereto, a maximum value of pixel values within the predetermined range neighboring to the pixel of the pixel value x(i, j) and outputs the maximum value xmax(i, j) as a characteristic amount of the pixel value x(i, j).

In particular, the characteristic amount filter 16 processes pixel values x(i, j) successively inputted thereto by arithmetic processing of the following expressions (10) and successively outputs maximum values xmax(i, j) obtained by the arithmetic processing.

$$xmax(i, j) = max(x(i+di, j+dj))$$

$$-M/2 \leq di \leq M/2$$

$$-N/2 \leq dj \leq N/2 \qquad (10)$$

where max is a function for calculating a maximum value of x which satisfies a predetermined condition. The predetermined condition here is a range of M×N pixels around the pixel of the pixel value x(i, j). It is to be noted that, in regard to the image pickup result VT inputted in the order of raster scanning, the horizontal direction is indicated by the subscript i while the vertical direction is indicated by the subscript j as seen in FIG. 5.

The area discrimination filter 10 discriminates an area to which the input image data belongs with reference to the maximum value xmax(i, j) detected in this manner, and outputs a result of the discrimination. In this instance, the area discrimination filter 10 detects an average value of the maximum values xmax(i, j), discriminates to which average brightness level area the input image data belongs, and outputs the average value as an identification signal.

In particular, the area discrimination filter 10 is a two-dimensional low-pass filter, and detects, for each of maximum values xmax(i, j) successively inputted thereto in the order of raster scanning, a low frequency component r(i, j) represented by the following expression (11) and outputs such low frequency component r(i, j) as identification signal of each area.

$$r(i, j) = \sum_{dj=-\frac{N}{2}}^{\frac{N}{2}} \sum_{di=-\frac{M}{2}}^{\frac{M}{2}} \frac{xmax(i+di, j+dj)}{M \times N} \qquad (11)$$

where N and M are constants representing the magnitude of the neighboring area for calculation of an average value, but have values independent of the values N and M appearing in the expression (3) above. Thus, the area discrimination filter 10 removes fine structures from the image pickup result VT with reference to the maximum values xmax(i, j) to extract areas in which the pixel values are comparatively flat. It is to be noted that, since the area discrimination filter 10 is provided in order to perform such processing as just described, preferably it has a comparatively narrow bandwidth.

From the image pickup result VT, a characteristic amount of each pixel value x(i, j) is detected by the characteristic amount filter 16 of the gradation correction circuit 8C. In other words, from the image pickup result VT, the maximum values xmax(i, j) of pixel values within predetermined neighboring areas to the individual pixels are detected as characteristic amounts of the corresponding pixel values x(i, j).

From the image pickup result VT, an area to which each input image data belongs is discriminated based on the corresponding maximum value xmax(i, j) detected in this manner by the area discrimination filter 10, and a result of the discrimination is outputted from the area discrimination filter 10. More specifically, the area discrimination filter 10 detects low frequency components r(i, j) which are average values of the maximum values xmax(i, j) and thereby eliminates fine structures in the image and extracts areas in which the pixel values are comparatively flat. Further, the low frequency components r(i, j) are outputted as identification signals of the individual areas.

In this instance, since, in the image pickup result VT obtained by filtering with a color filter of a diced arrangement of complementary colors as described above, an average of neighboring pixel values represents brightness information (FIG. 3) and a maximum value of the low frequency component r(i, j) is detected as maximum value xmax(i, j) by the characteristic amount filter 16, the low frequency component r(i, j) varies in response to the amplitude of the color signal superposed on the brightness signal.

Consequently, since the characteristic amount filter detects a maximum value xmax(i, j) of pixel values in a predetermined range neighboring to each pixel as a characteristic amount and obtains a discrimination result with reference to the characteristic amount, the gradation can be corrected while effectively preventing saturation of the pixel value y(i, j), and consequently, the color can be regenerated correctly.

Third Modification to the First Embodiment

Figure 11:
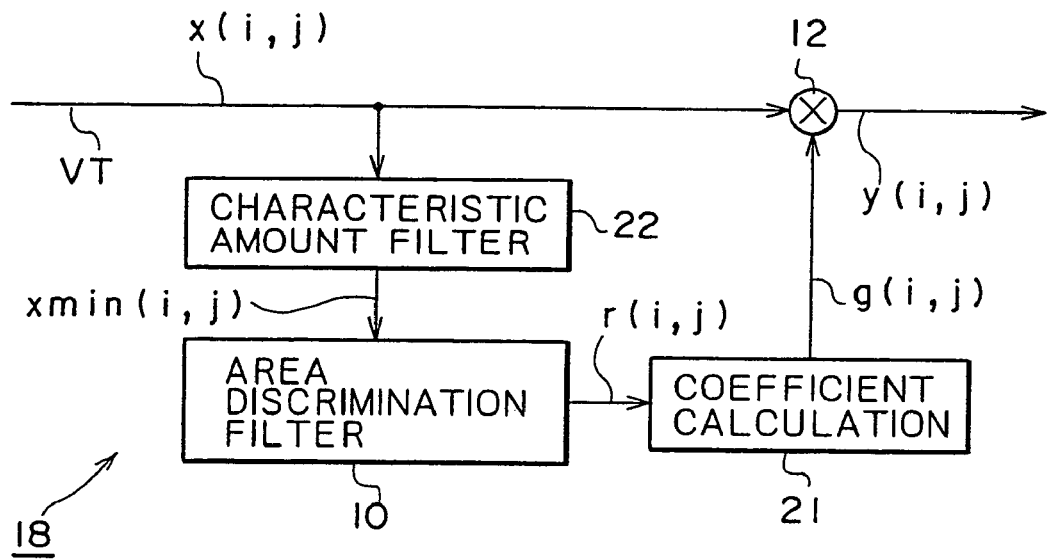
FIG. 11 is a block diagram showing a gradation correction circuit applied to a third modification to the television camera of the first embodiment of the present invention.

FIG. 11 shows a gradation correction circuit applied to a third modification to the television camera 1 of the first embodiment shown in FIG. 1. Referring to FIG. 11, the gradation correction circuit is generally denoted at 18 and applied in place of the gradation correction circuit 8C of the modified television camera 1 described hereinabove with reference to FIG. 10. The gradation correction circuit 18 includes a characteristic amount filter 22, an area discrimination filter 10, a coefficient calculation circuit 21, and a multiplication circuit 12. The area discrimination filter 10 and multiplication circuit 12 are similar to those described hereinabove with reference to FIG. 10 or 1, and overlapping description of them is omitted here to avoid redundancy.

The characteristic amount filter 22 in the gradation correction circuit 18 detects a characteristic amount of each pixel value x(i, j) of an image pickup result VT inputted thereto from the addition circuit 5 (FIG. 10) and outputs the detected characteristic amount. The characteristic amount filter 22 is a two-dimensional minimum value filter, and detects, for each one of pixel values x(i, j) of the image pickup result VT successively inputted thereto, a minimum value xmin(i, j) of pixel values within a predetermined range around a pixel of the pixel value x(i, j) and outputs the minimum value xmin(i, j) as a characteristic amount of the pixel value x(i, j).

In particular, the characteristic amount filter 22 processes the pixel values x(i, j) successively inputted thereto by arithmetic processing of the following expressions (12) and successively outputs minimum values xmin(i, j) obtained by the arithmetic processing.

$$xmin(i, j) = min(x(i+di, j+dj))$$

$$-M/2 \leq di \leq M/2$$

$$-N/2 \leq dj \leq N/2 \qquad (12)$$

where min is a function for calculating a minimum value of x which satisfies a predetermined condition.

Figure 12:
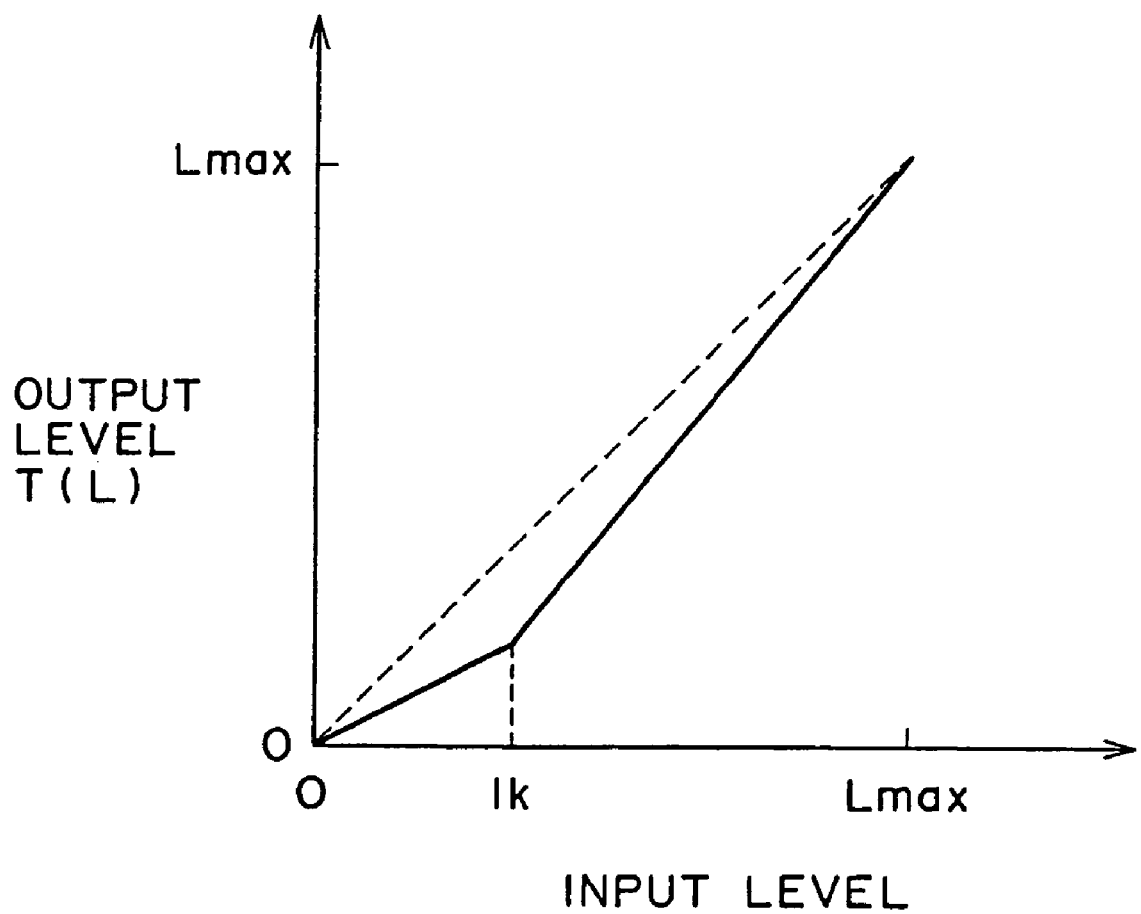
FIG. 12 is a signal waveform diagram illustrating operation of the gradation correction circuit of the FIG. 11 of the first embodiment of the present invention.

The coefficient calculation circuit 21 produces a contrast correction coefficient g(i, j) in accordance with a coefficient calculation function G obtained by arithmetic processing of the level conversion function T(L) illustrated in FIG. 12 in accordance with the expression (5) in response to the signal level of the low frequency component r(i, j). The level conversion function T(L) here is a characteristic set so that the signal level may be suppressed in an image portion in which the brightness level is lower than the predetermined reference level Lk.

Where the correction coefficient g(i, j) is set in this manner, if the gain is controlled merely with the low frequency component of the pixel value x(i, j), then there is the possibility that, contrary to the case of the second modification to the television camera 1 of the first embodiment shown in FIG. 1, in an image portion in which the signal level of the low frequency component r(i, j) is low, the pixel value y(i, j) of the corrected gradation may be saturated, resulting in loss of color information. Therefore, correct color regeneration in such an image portion as described above is difficult.

However, where the gradation correction circuit 18 is employed, since a minimum value of a pixel value x(i, j) is detected as a characteristic amount xmin(i, j), in an image portion in which such saturation as described above may possibly occur, the average brightness level r(i, j) as an identification result can be decreased to increase the gain upon gradation correction, and consequently, saturation of the pixel value y(i, j) can be prevented effectively as much and color regeneration can be performed correctly.

Where the gradation correction circuit 18 is employed as shown in FIG. 11, since a minimum value in a predetermined area is detected as a characteristic amount and used for correction of the gradation, even where the gradation is corrected so as to suppress the signal in an image area in which the brightness level is lower than the reference level Lk, similar effects to those achieved by the modified television camera 1 of FIG. 10 can be achieved.

Fourth Modification to the First Embodiment

Figure 13:
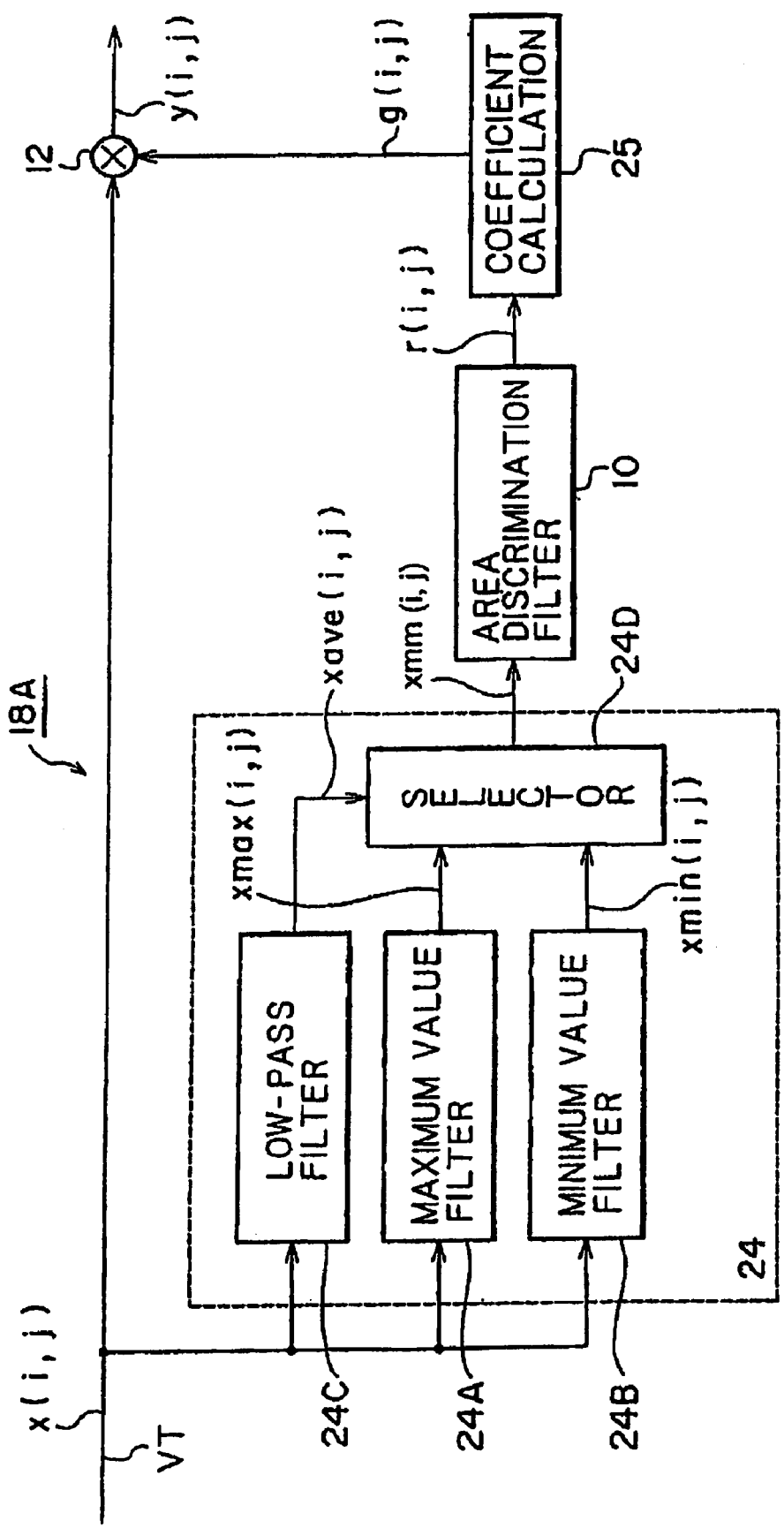
FIG. 13 is a block diagram showing a gradation correction circuit applied to a fourth modification to the television camera of the first embodiment of the present invention.

FIG. 13 shows a gradation correction circuit applied to a fourth modification to the television camera 1 of the first embodiment shown in FIG. 1. Referring to FIG. 13, the gradation correction circuit is generally denoted at 18A and applied in place of the gradation correction circuit 8C of the modified television camera 1 described hereinabove with reference to FIG. 10. The gradation correction circuit 18A includes a characteristic amount filter 24, an area discrimination filter 10, a coefficient calculation circuit 25, and a multiplication circuit 12. The area discrimination filter 10 and multiplication circuit 12 are similar to those described hereinabove with reference to FIG. 10 or 1, and overlapping description of them is omitted here to avoid redundancy.

The characteristic amount filter 24 in the gradation correction circuit 18A detects and outputs a characteristic amount of each pixel value x(i, j) of an image pickup result VT. More particularly, the characteristic amount filter 24 includes a maximum value filter 24A which is constructed similarly to the characteristic amount filter 16 described hereinabove with reference to FIG. 10 and detects and outputs, for each of pixel values x(i, j) of the image pickup result VT successively inputted thereto, a maximum value xmax(i, j) of pixel values within a predetermined range neighboring to the pixel having the pixel value x(i, j).

The characteristic amount filter 24 further includes a minimum value filter 24B which is constructed similarly to the characteristic amount filter 22 described hereinabove with reference to FIG. 11 and detects and outputs, for each of the pixel values x(i, j) of the image pickup result VT successively inputted thereto, a minimum value xmin(i, j) of pixel values in the predetermined range neighboring to the pixel having the pixel value x(i, j).

The characteristic amount filter 24 further includes a low-pass filter 24C in the form of a two-dimensional low-pass filter and detects and outputs, for each of the pixel values x(i, j) of the image pickup result VT successively inputted thereto, an average value xave(l, j) of pixel values. It is to be noted that the low-pass filter 24C is set such that the constants M and N which define the magnitude of a neighboring area represented by the expression (11) given hereinabove have lower values that those of the area discrimination filter 10 so that that the low-pass filter 24C may have a pass-band width greater than that of the area discrimination filter 10.

The characteristic amount filter 24 further includes a selector 24D which compares the average value xave(i, j) outputted from the low-pass filter 24C with a predetermined reference value and selectively outputs the maximum value xmax(i, j) outputted from the maximum value filter 24A or the minimum value xmin(i, j) outputted from the minimum value filter 24B based on a result of the comparison. In particular, when the average value xave(i, j) is higher than the reference level, the selector 24D selectively outputs the maximum value xmax(i, j) outputted from the maximum value filter 24A, but when the average value xave(i, j) is lower than the reference level, the selector 24D selectively outputs the minimum value xmin(i, j) outputted from the minimum value filter 24B. Consequently, the selector 24D composes the maximum value xmax(i, j) and the minimum value xmin(i, j) to obtain a characteristic amount xmm(i, j) and outputs the characteristic amount xmm(i, j).

Figure 31:
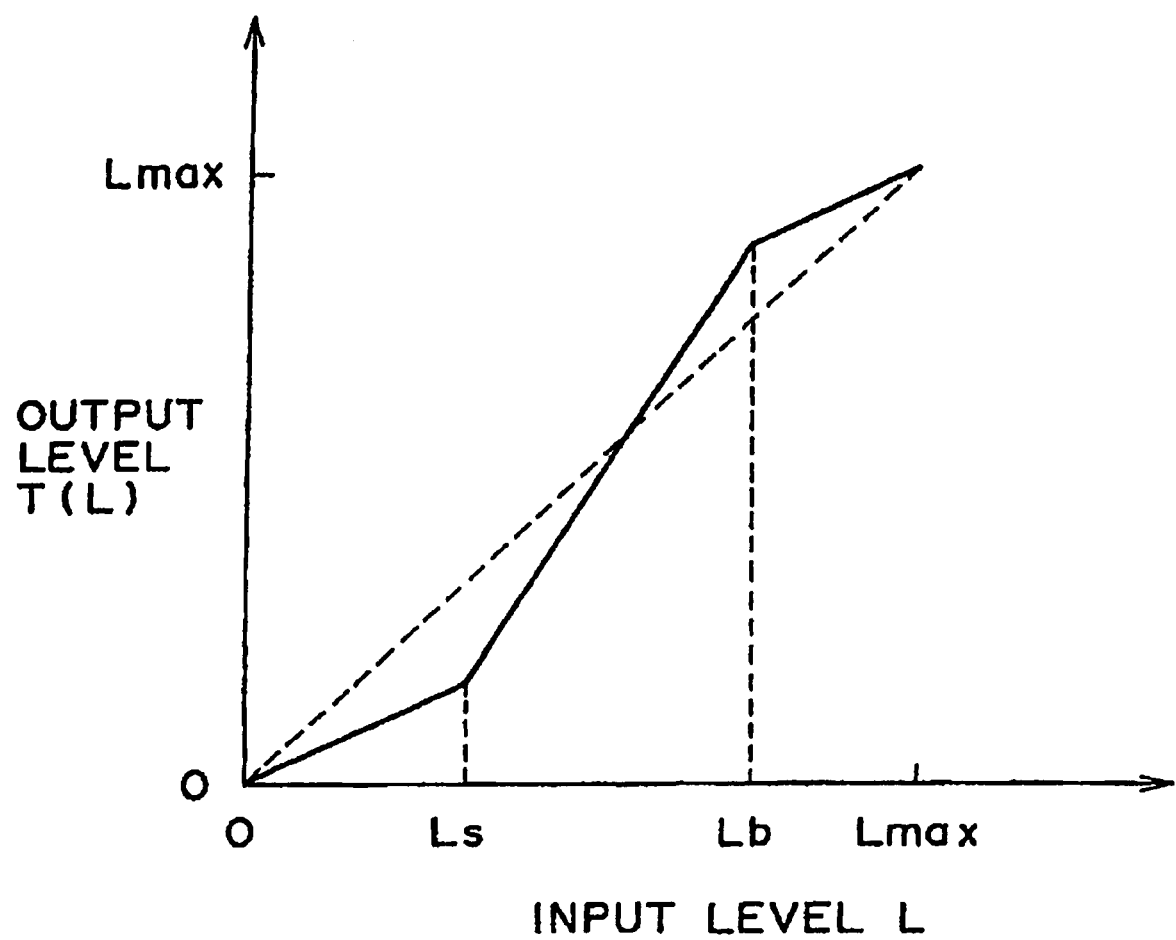
FIG. 31 is a characteristic diagram illustrating another level conversion function applied to different conventional suppression processing for a dynamic range.
Figure 32:
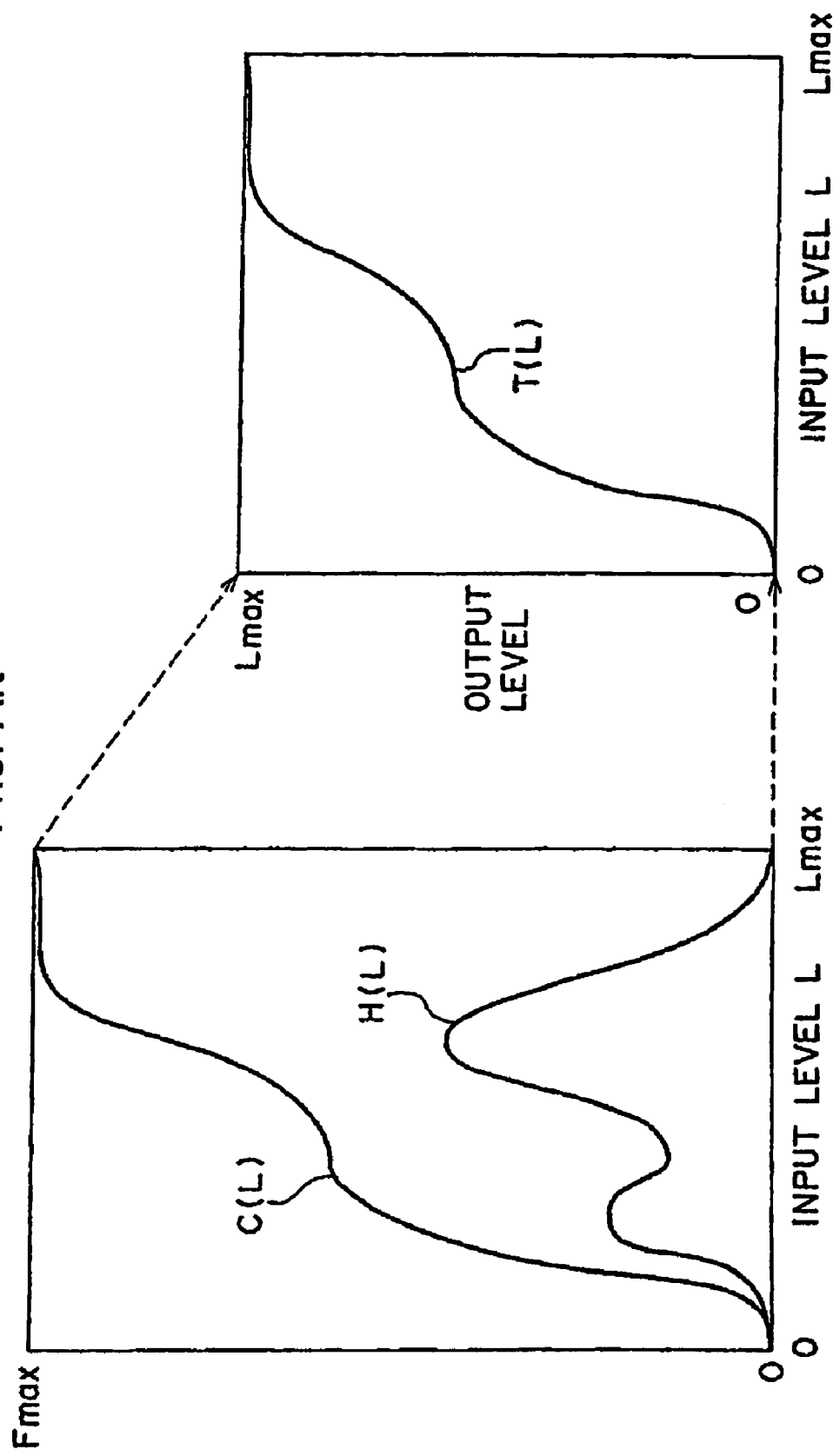
FIG. 32 is a characteristic diagram illustrating processing of histogram equalization.

The coefficient calculation circuit 25 produces a contrast correction coefficient g(i, j) from a coefficient calculation function G obtained by arithmetic processing of the level conversion function T(L) illustrated in FIG. 31 in accordance with the expression (5) given hereinabove in response to the signal level of the low frequency component r(i, j).

In this instance, when the contrast correction coefficient g(i, j) is set in this manner, if the gain is controlled merely with a low frequency component of the pixel value x(i, j), then there is the possibility that color information may be lost in image portions in which the signal level of the low frequency component r(i, j) is comparatively high and comparatively low, and correct color regeneration in such image portions is difficult.

Where the gradation correction circuit 18A is employed, however, since a low frequency component r(i, j) is produced from a characteristic amount xmm(i, j) obtained by composition by switching the maximum value xmax(i, j) and the minimum value xmin(i, j) of the pixel value x(i, j) with the average value xave(i, j) of the pixel value x(i, j) and the gain is controlled with the low frequency component r(i, j), the gain upon gradation correction can be increased or decreased in an image portion in which such saturation as described above may possibly occur, and correct color regeneration can be achieved while effectively preventing saturation of the pixel value y(i, j) effectively as much.

Where the gradation correction circuit 18A shown in FIG. 13 is employed, since a characteristic amount xmm(i, j) is produced by switching a maximum value xmax(i, j) and a minimum value xmin(i, j) of a pixel value x(i, j) with an average value xave(i, j) of the pixel value x(i, j), even when the gradation is corrected so that the signal level may be suppressed in an image portion in which the brightness level is lower than a predetermined reference level Ls and another image portion in which the signal level is higher than another reference level Lb, similar effects to those achieved by the television camera 1 of FIG. 1 can be achieved.

It is to be noted that, in the gradation correction circuit 18A shown in FIG. 13, a weighting addition circuit may be provided in place of the selector 24D.

In particular, the weighting addition circuit in this instance executes arithmetic processing of the following expressions (14) based on an average value xave(i, j) of pixel values x(i, j) outputted from the low-pass filter 24C to produce a weighting coefficient a:

$$a = 0.0 \ldots xave(i, j) < THL \quad (13)$$
$$a = \{xave(i, j) - THL\} / (THH - THL)$$
$$\ldots THL \leq xave(i, j) \leq THH$$
$$a = 1.0 \ldots xave(i, j) > THH \ldots$$

where THL and THH are constants for normalization.

Further, the weighting addition circuit executes arithmetic processing of the following expression (14) using the weighting coefficient a produced in this manner thereby to compose the maximum value xmax(i, j) and the minimum value xmin (i, j) to produce a characteristic amount xmm(i, j).

$$xmm(i, j) = a \times xmax(i, j) + (1-a) \times xmin(i, j) \quad (14)$$

Consequently, the weighting addition circuit produces the characteristic amount xmm(i, j) by weighted averaging of the maximum value xmax(i, j) and the minimum value xmin(i, j) with reference to the average value xave(i, j) of the pixel value x(i, j).

Where the weighting addition circuit is employed, since the maximum value xmax(i, j) and the minimum value xmin (i, j) can be composed smoothly with reference to the average value xave(i, j) of the pixel value x(i, j) to produce the characteristic amount xmm(i, j), similar advantages to those achieved by the television camera 1 of the forth modification to the first embodiment can be achieved.

Fifth Modification to the First Embodiment

FIG. 14 shows a gradation correction circuit applied to a fifth modification to the television camera 1 of the first embodiment shown in FIG. 1. Referring to FIG. 14, the gradation correction circuit is generally denoted at 18B and applied in place of the gradation correction circuit 8C of the modified television camera 1 described hereinabove with reference to FIG. 10. The gradation correction circuit 18B includes a characteristic amount filter 16, a quantization circuit 43, an area discrimination filter 40, a lookup table (LUT) 44, and a multiplication circuit 12. The characteristic amount filter 16 and multiplication circuit 12 are similar to those described hereinabove with reference to FIG. 10, and overlapping description of them is omitted here to avoid redundancy.

The quantization circuit 43 re-quantizes a characteristic value xmax(i, j) to decrease the bit number of the characteristic amount xmax(i, j) and outputs the characteristic amount xmax(i, j) of the reduced bit number as a characteristic amount xmaxq(i, j). In particular, the quantization circuit 43 executes arithmetic processing of the following expression (15) with a quantization step Q set in advance for a pixel value x(i, j) to linearly quantize the characteristic amount xmax(i, j) to produce and output a characteristic amount xmaxq(i, j).

$$xmaxq(i, j) = int\{xmax(i, j)/Q + 0.5\} \quad (15)$$

where int(a) is a function of discarding the fraction of a.

The area discrimination filter 40 is formed similarly to the area discrimination filter 10 described hereinabove in the second modification to the first embodiment with reference to FIG. 10 except that it processes a signal of a different bit number.

The lookup table (LUT) 44 forms a coefficient calculation circuit and outputs a correction coefficient g(i, j) using a low frequency component r(i, j) outputted from the area discrimination filter 40 as an address. To this end, the lookup table 44 stores a correction coefficient LUT(i) given by the following expression (16) at an ith address thereof.

$$LUT(i) = G(i \times Q) \quad (16)$$

Where the gradation correction circuit 18B shown in FIG. 14 is employed, since a characteristic amount is quantized in advance, similar effects to those achieved by the television camera 1 which employs the area discrimination filter 10 described hereinabove with reference to FIG. 10 can be achieved by the television camera 1 having a more simplified construction. Further, since a lookup table is used to produce a correction coefficient, the processing of the entire gradation correction circuit 18B can be simplified. Furthermore, since a characteristic amount quantized in advance is used, the construction of the area discrimination filter can be simplified and the lookup table can be reduced in scale.

Sixth Modification to the First Embodiment

FIG. 15 shows a gradation correction circuit applied to a sixth modification to the television camera 1 of the first embodiment shown in FIG. 1. Referring to FIG. 15, the gradation correction circuit is generally denoted at 18C and applied in place of the gradation correction circuit 18B described hereinabove with reference to FIG. 14. The gradation correction circuit 18C includes a characteristic amount filter 16, a quantization circuit 43, an area discrimination filter 40, a lookup table 54, an interpolation circuit 55, and a multiplication circuit 12. Thus, the gradation correction circuit 18C is a modification to and different from the gradation correction circuit 18B described hereinabove with reference to FIG. 14 in that it includes the lookup table 54 and the interpolation circuit 55 in place of the lookup table 44. The characteristic amount filter 16, quantization circuit 43, area discrimination filter 40 and multiplication circuit 12 are similar to those described hereinabove with reference to FIG. 14, and overlapping description of them is omitted here to avoid redundancy.

The lookup table 54 in the gradation correction circuit 18C has a number of addresses smaller than the number of levels which can be assumed by the output value r(i, j) of the area discrimination filter 40, and is accessed with a value of the output value r(i, j) whose predetermined lower bits are omitted. When the lookup table 54 is accessed in this manner, it outputs two addresses addr0(i, j) and addr1(i, j) represented by the following expressions (17) and two correction coefficients g0(i, j) and g1(i, j).

$$addr0(i, j) = int\{r(i, j)/Rmax \times R'max\}$$
$$addr1(i, j) = addr0(i, j) + 1 \quad (17)$$

where Rmax is a maximum value which can be assumed by the output value x(i, j) of the area discrimination filter 40, and R'max is a maximum value which can be assumed by the address of the lookup table 54.

It is to be noted that the lookup table 54 produces the address addr0(i, j) by omitting lower bits of the output value r(i, j) of the area discrimination filter 40 and produces the address addr1(i, j) by adding a bit of the logic 1 to the lowest bit of the address addr0(i, j).

The interpolation circuit 55 executes interpolation arithmetic processing in accordance with the following expressions (18) using the addresses addr0(i, j) and addr1(i, j) and the correction coefficients g0 (i, j) and g1 (i, j) inputted thereto from the lookup table 54 and outputs a result of the interpolation as a correction coefficient g(i, j).

$$g(i, j) = \{r'(i, j) - addr0(i, j)\}/\{addr1(i, j) - addr0(i, j)\} \times \{g1(i, j) - g0(i, j)\} + g0(i, j) \quad (18)$$

$$r'(i, j) = r(i, j)/R\max \times R'\max$$

Where the gradation correction circuit 18C shown in FIG. 15 is employed, since interpolation arithmetic processing is performed to produce a correction coefficient, a correction coefficient whose value exhibits a smooth variation can be produced using a lookup table of a comparatively small scale, and the gradation can be corrected with a higher degree of accuracy as much.

Seventh Modification to the First Embodiment

Figure 16:
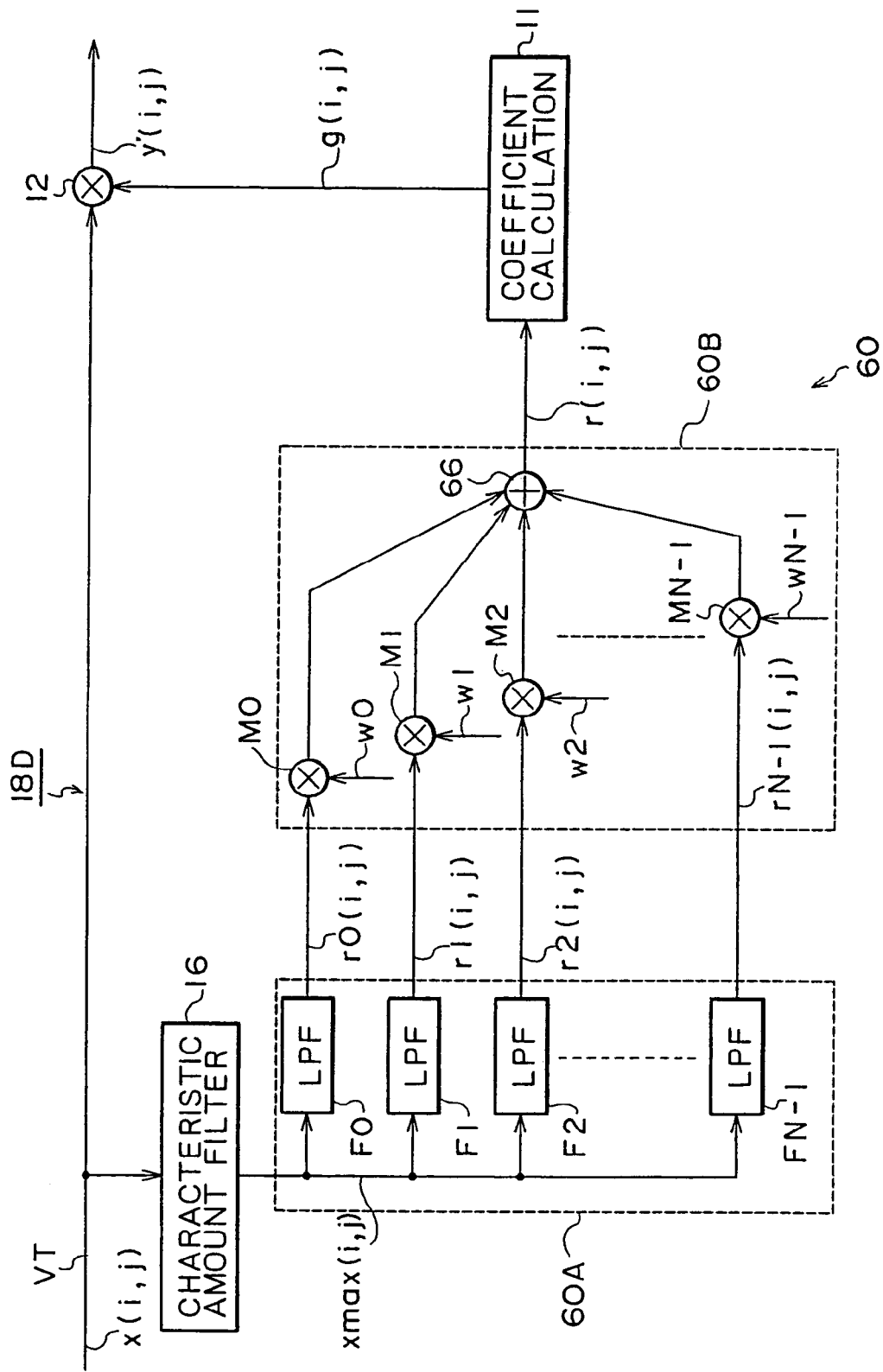
FIG. 16 is a block diagram showing a gradation correction circuit applied to a seventh modification to the television camera of the first embodiment of the present invention.

FIG. 16 shows a gradation correction circuit applied to a seventh modification to the television camera 1 of the first embodiment shown in FIG. 1. Referring to FIG. 16, the gradation correction circuit is generally denoted at 18D and applied in place of the gradation correction circuit 8C of the modified television camera 1 described hereinabove with reference to FIG. 10. The gradation correction circuit 18D includes a characteristic amount filter 16, an area discrimination filter 60, a coefficient calculation circuit 11, and a multiplication circuit 12. The characteristic amount filter 16, coefficient calculation circuit 11 and multiplication circuit 12 are similar to those described hereinabove with reference to FIG. 10, and overlapping description of them is omitted here to avoid redundancy.

The area discrimination filter 60 in the gradation correction circuit 18D includes a low-pass filter section 60A which discriminates an area to which input image data belongs with different resolutions to obtain and output identification signals r0(i, 1), r1(i, j), r2(i, j), . . . rN−1(i, j), and a signal composition section 60B for producing an identification signal r(i, j) of a single composite signal based on the identification signals r0(i, 1), r1(i, j), r2(i, j), . . . rN−1 (i, j) according to the different resolutions.

The low-pass filter section 60A is formed from low-pass filters (LPF) F0, F1, F2, . . . , FN−1 having different pass-band widths. A characteristic amount xmax(i, j) from the characteristic amount filter 16 is inputted to the low-pass filters F0, F1, F2, . . . , FN−1, and corresponding frequency components are outputted as identification signals r0(i, j), r1(i, j), r2(i, j), . . . , rN−1 (i, j) from the low-pass filters F0, F1, F2, . . . , FN−1, respectively. The signals composition section 60B includes multiplication circuits M0, M1, M2, . . . , MN−1 which receive and weight the identification signals r0(i, j), r1(i, j), r2(i, j), . . . , rN−1(i, j), and an addition circuit 66 which adds the weighted identification signals r0(i, j), r1(i, j), r2(i, j), . . . , rN−1 (i, j) to produce a composite signal as an identification signal r(i, j). The identification signal r(i, j) thus obtained by the addition circuit 66 is outputted from the signal composition section 60B. It is to be noted that weighting coefficients w0, w1, w2, . . . , wN−1 which are used by the multiplication circuits M0, M1, M2, . . . , MN−1, respectively, are set in advance so that they may satisfy the following relational expression (19):

$$\sum_{k=0}^{N-1} wk = 1 \quad (19)$$

Consequently, in the gradation correction circuit 18D described above, a profile provided by the image pickup result VT is not emphasized abnormally according to the setting of the weighting coefficients w0, w1, w2, . . . wN−1.

In particular, when the pixel value x(i, j) varies suddenly as seen in FIG. 23(A), the signal level of the low frequency component r(i, j) varies so that such a sudden variation of the pixel value may be moderated. When the variation of the low frequency component r(i, j) of the pixel value x(i, j) is displaced to the higher level side with respect to the inflection point of the characteristic described hereinabove with reference to FIG. 6, if the correction coefficient g(i, j) is produced merely based on an output signal of a low-pass filter as in the television camera 1 of the second modification of FIG. 10, then the pixel value is amplified with an excessively high gain immediately before the pixel value x(i, j) varies suddenly, but immediately after the pixel value x(i, j) varies suddenly, the pixel value is amplified with an excessively low gain. Consequently, an output value y(i, j) (FIG. 23(B)) which provides an abnormally amplified profile is obtained.

In this instance, such abnormal emphasis of the profile as just described can be reduced by correcting the pixel values with a substantially uniform gain.

Consequently, where the gradation correction circuit 18D shown in FIG. 16 is employed, since a correction coefficient is produced from a plurality of different low frequency components, abnormal emphasis of a profile can be prevented effectively, and similar advantages to those achieved by the television camera 1 of the first embodiment and the second modification to it described hereinabove with reference to FIGS. 1 and 10, respectively, can be achieved.

Eighth Modification to the First Embodiment

Figure 17:
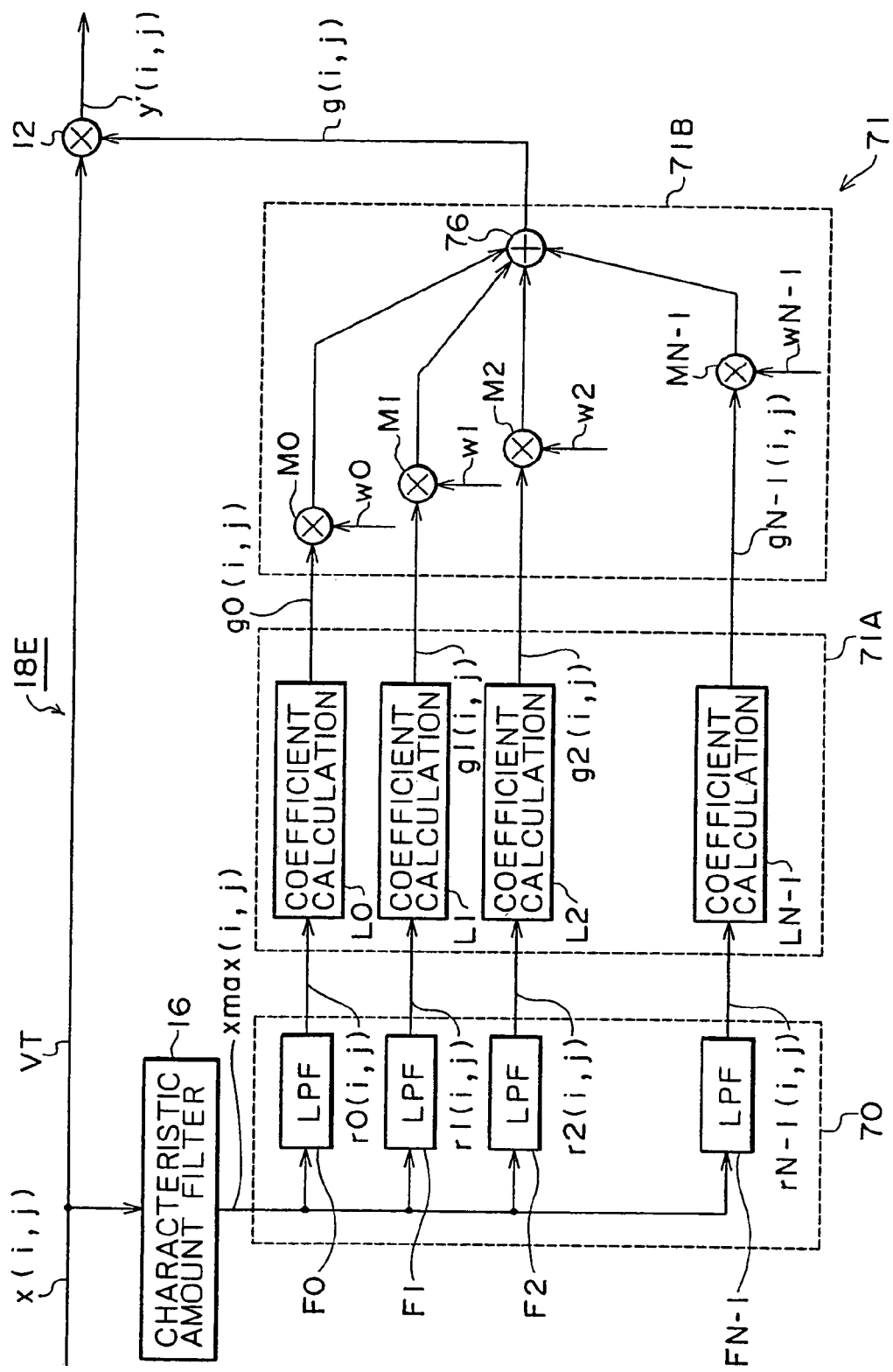
FIG. 17 is a block diagram showing a gradation correction circuit applied to an eighth modification to the television camera of the first embodiment of the present invention.

FIG. 17 shows a gradation correction circuit applied to an eighth modification to the television camera 1 of the first embodiment shown in FIG. 1. Referring to FIG. 17, the gradation correction circuit is generally denoted at 18E and applied in place of the gradation correction circuit 8C of the modified television camera 1 described hereinabove with reference to FIG. 10. The gradation correction circuit 18E includes a characteristic amount filter 16, an area discrimination filter 70, a coefficient calculation circuit 71, and a multiplication circuit 12. The characteristic amount filter 16 and multiplication circuit 12 are similar to those described hereinabove with reference to FIG. 10, and overlapping description of them is omitted here to avoid redundancy.

The area discrimination filter 70 in the gradation correction circuit 18E discriminates an area to which input image data belongs with different resolutions with reference to a characteristic amount xmax(i, j) and outputs discrimination results r0(i, j), r1(i, j), r2(i, j), . . . , rN−1(i, j) of the area. In particular, the area discrimination filter 70 is formed from low-pass filters (LPF) F0, F1, F2, . . . , FN−1 having different pass-band widths. A characteristic amount xmax(i, j) from the characteristic amount filter 16 is inputted to the low-pass filters F0, F1, F2, . . . , FN−1, and corresponding frequency components are outputted as identification signals r0(i, j), r1(i, j), r2(i, j), . . . , rN−1 (i, j) from the low-pass filters F0, F1, F2, . . . , FN−1, respectively.

The coefficient calculation circuit 71 includes a coefficient production section 71A for producing, from the identification signals r0(i, j), r1(i, j), r2(i, j), . . . , rN−1 (i, j), corresponding correction coefficients g0(i, j), g1(i, j), g2(i, j), . . . , gN−1 (i, j), and a coefficient composition section 71B for composing the correction coefficients g0(i, j), g1(i, j), g2(i, j), . . . , gN−1 (i, j) to produce a single correction coefficient g(i, j).

The coefficient production section 71A includes coefficient calculation sections L0, L1, L2, . . . , LN−1 for producing, from the identification signals r0(i, j), r1(i, j), r2(i, j), . . . , rN−1 (i, j), corresponding correction coefficients g0(i, j), g1(i, j), g2(i, j), . . . , gN−1 (i, j) based on predetermined respective coefficient calculation functions Gk (k=0, 1, 2, . . . , N−1 ).

The coefficient composition section 71B includes multiplication circuits M0, M1, M2, . . . , MN−1 which weight the correction coefficients g0(i, j), g1(i, j), g2(i, j), . . . , gN−1 (i, j), and an addition circuit 76 which adds results of the weighting by the multiplication circuits M0, M1, M2, . . . , MN−1 to produce and output a single correction coefficient g(i, j). It is to be noted that weighting coefficients w0, w1, w2, . . . , wN−1 used by the multiplication circuits M0, M1, M2, . . . , MN−1, respectively, are set in advance so that the relational expression (13) given hereinabove may be satisfied.

Where the gradation correction circuit 18E shown in FIG. 17 is employed, correction coefficients are produced from a plurality of different low frequency components and a signal correction coefficient is produced from the produced correction coefficients, and consequently, similar advantages to those achieved by the gradation correction circuit 18D described hereinabove with reference to FIG. 16 can be achieved.

Second Embodiment

Figure 18:
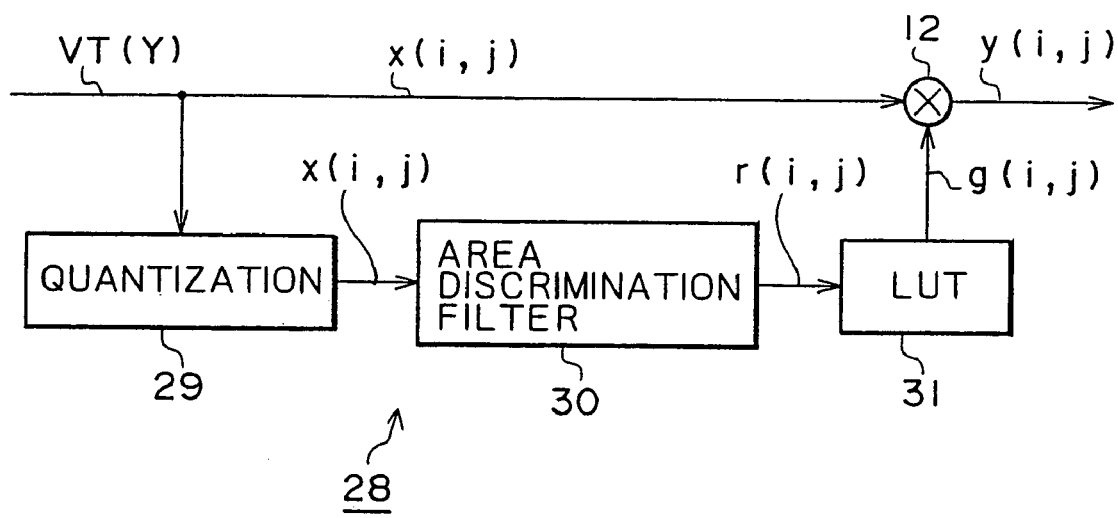
FIG. 18 is a block diagram showing a gradation correction circuit applied to a television camera according to a second embodiment of the present invention.

FIG. 18 is a block diagram showing a gradation correction circuit applied to a television camera according to a second preferred embodiment of the present invention. The gradation correction circuit is generally denoted at 28 and is adapted in place of the gradation correction circuit 8 described hereinabove with reference to FIG. 1. The gradation correction circuit 28 includes a quantization circuit 29, an area discrimination filter 30, a lookup table (LUT) 31, and a multiplication circuit 12. The multiplication circuit 12 is similar to that of the gradation correction circuit 8 of the television camera 1 described hereinabove with reference to FIG. 1, and overlapping description of it is omitted here to avoid redundancy.

The quantization circuit 29 quantizes a pixel value of a brightness signal Y which forms an image pickup result VT to reduce the bit number of the brightness signal Y and outputs the brightness signal Y of the reduced bit number. In particular, the quantization circuit 29 in the gradation correction circuit 28 executes, for each pixel value x(i, j), arithmetic processing of the following expression (20) with a quantization step Q set in advance to linearly quantize the pixel value x(i, j) to obtain a pixel value x'(i, j) and outputs the pixel value x'(i, j).

$$x'(i, j) = int(x/Q + 0.5) \quad (20)$$

where int(a) is a function of discarding the fraction of a.

The area discrimination filter 30 is formed similarly to the area discrimination filter 10 described hereinabove with reference to FIG. 10 except that it handles a signal of a different bit number.

The lookup table 31 forms a coefficient calculation circuit similar to the coefficient calculation circuit 11 of the television camera 1 of the first embodiment described hereinabove with reference to FIG. 1 and produces and outputs a correction coefficient g(i, j) using a low frequency component r(i, j) outputted from the area discrimination filter 30 as an address. To this end, the lookup table 31 stores a correction coefficient LUT(i) given by the following expression (21) as an ith address.

$$LUT(i) = G(i \times Q) \quad (21)$$

Where the gradation correction circuit 28 is employed, a pixel value is quantized in advance and necessary processing is performed with the quantized pixel value. Consequently, similar advantages to those achieved by the television camera 1 described hereinabove with reference to FIG. 1 can be achieved. Further, since a correction coefficient is produced using a lookup table, the processing of the entire apparatus can be simplified as much. Furthermore, since a pixel value quantized in advance is used, the construction of the area discrimination filter can be simplified and the lookup table can be reduced in scale.

First Modification to the Second Embodiment

Figure 19:
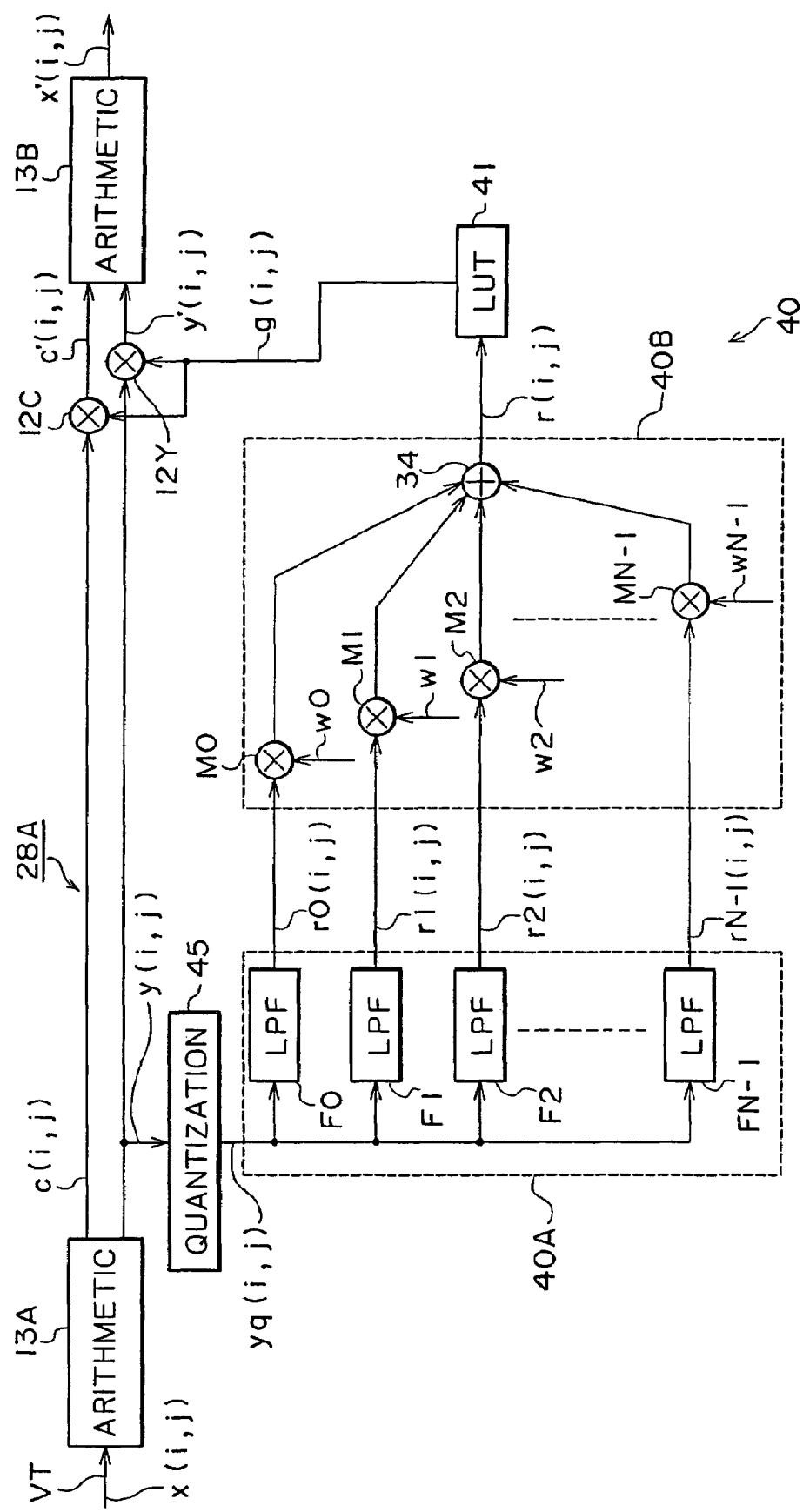
FIG. 19 is a block diagram showing a gradation correction circuit applied to a first modification to the television camera of the second embodiment of the present invention.

FIG. 19 shows a gradation correction circuit applied to a first modification to the television camera of the second embodiment described above with reference to FIG. 18. Referring to FIG. 19, the gradation correction circuit is generally denoted at 28A and applied in place of the gradation correction circuit 8A of the modified television camera 1 described hereinabove with reference to FIG. 9 or the gradation correction circuit 28 described above with reference to FIG. 18. The gradation correction circuit 28A includes a pair of arithmetic circuits 13A and 13B, a quantization circuit 45, an area discrimination filter 40, a lookup table (LUT) 41, and a pair of multiplication circuits 12C and 12Y. The arithmetic circuits 13A and 13B and multiplication circuits 12C and 12U are similar to those described hereinabove with reference to FIG. 9, and overlapping description of them is omitted here to avoid redundancy.

The quantization circuit 45 re-quantizes each brightness data y(i, j) to reduce the bit number of the brightness data y(i, j) and outputs the brightness data y(i, j) of the reduced bit number. In particular, the quantization circuit 45 in the gradation correction circuit 28A executes, for each pixel value y(i, j), arithmetic processing of the following expression (22) with a quantization step Q set in advance to linearly quantize the pixel value y(i, j) to obtain a pixel value yq(i, j) and outputs the pixel value yq(i, j).

$$yq(i, j) = int\{y(i, j)/Q + 0.5\} \quad (22)$$

where int(a) is a function of discarding the fraction of a.

The area discrimination filter 40 is formed similarly to the area discrimination filter 30 described hereinabove with reference to FIG. 18 except that it handles a signal of a different bit number.

The lookup table 41 forms a coefficient calculation circuit and outputs a correction coefficient g(i, j) using a low frequency component r(i, j) outputted from the area discrimination filter 40 as an address. To this end, the lookup table 41 stores a correction coefficient LUT(i) given by the following expression (23) as an ith address.

$$LUT(i) = G(i \times Q) \quad (23)$$

Where the gradation correction circuit 28A shown in FIG. 19 is employed, brightness data is quantized in advance and necessary processing is performed with the quantized pixel value. Consequently, similar advantages to those achieved by the television camera 1 described hereinabove with reference to FIG. 1 can be achieved with a further simplified construction. Further, since a correction coefficient is produced using a lookup table, the processing of the entire apparatus can be simplified as much. Furthermore, since a pixel value quantized in advance is used then, the construction of the area discrimination filter can be simplified and the lookup table can be reduced in scale.

Third Embodiment

Figure 20:
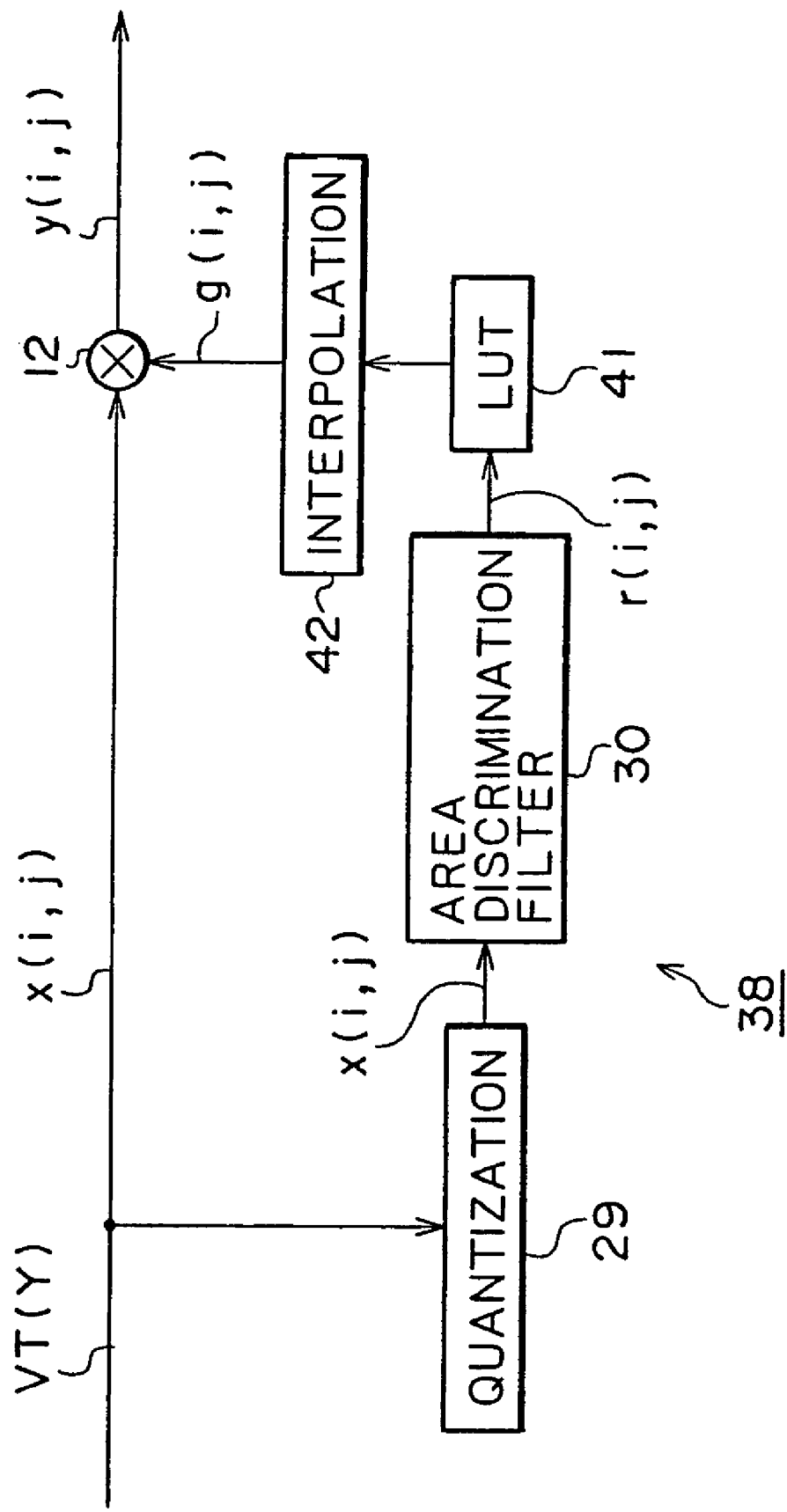
FIG. 20 is a block diagram showing a gradation correction circuit applied to a television camera according to a third embodiment of the present invention.

FIG. 20 is a block diagram showing a gradation correction circuit applied to a television camera according to a third preferred embodiment of the present invention. The gradation correction circuit is generally denoted at 38 and is adapted in place of the gradation correction circuit 28 described hereinabove with reference to FIG. 18. The gradation correction circuit 38 includes a quantization circuit 29, an area discrimination filter 30, a lookup table (LUT) 41, an interpolation circuit 42, and a multiplication circuit 12. The quantization circuit 29, area discrimination filter 30 and multiplication circuit 12 are similar to those of the gradation correction circuit 28 described hereinabove with reference to FIG. 18, and overlapping description of it is omitted here to avoid redundancy. The gradation correction circuit 38 thus includes the lookup table 41 and the interpolation circuit 42 in place of the lookup table 31 of the gradation correction circuit 28.

The lookup table 41 in the gradation correction circuit 38 has a number of addresses smaller than the number of levels which can be assumed by the output value r(i, j) of the area discrimination filter 30, and is accessed with a value of the output value r(i, j) whose predetermined lower bits are omitted. When the lookup table 54 is accessed in this manner, it outputs two addresses addr0(i, j) and addr1(i, j) represented by the following expressions (24) and two correction coefficients g0(i, j) and g1(i, j).

$$addr0(i, j) = int\{r(i, j)/Rmax \times R'max\}$$

$$addr1(i, j) = addr0(i, j) + 1 \quad (24)$$

where Rmax is a maximum value which can be assumed by the output value x(i, j) of the area discrimination filter 30, and R'max is a maximum value which can be assumed by the address of the lookup table 41.

It is to be noted that the lookup table 41 produces the address addr0(i, j) by omitting lower bits of the output value r(i, j) of the area discrimination filter 30 and produces the address addr1(i, j) by adding a bit of the logic 1 to the lowest bit of the address addr0(i, j).

The interpolation circuit 42 executes interpolation arithmetic processing in accordance with the following expressions (25) using the addresses addr0(i, j) and addr1(i, j) and the correction coefficients g0 (i, j) and g1 (i, j) inputted thereto from the lookup table 41 and outputs a result of the interpolation as a correction coefficient g(i, j).

$$g(i, j) = \{r'(i, j) - addr0(i, j)\}/\{addr1(i, j) - \quad (18)$$
$$addr0(i, j)\} \times \{g1(i, j) - g0(i, j)\} + g0(i, j)$$
$$r'(i, j) = r(i, j) / Rmax \times R'max$$

Where the gradation correction circuit 38 shown in FIG. 20 is employed, since interpolation arithmetic processing is performed to produce a correction coefficient, a correction coefficient whose value exhibits a smooth variation can be produced using a lookup table of a comparatively small scale, and the gradation can be corrected with a higher degree of accuracy as much.

First Modification to the Third Embodiment

Figure 21:
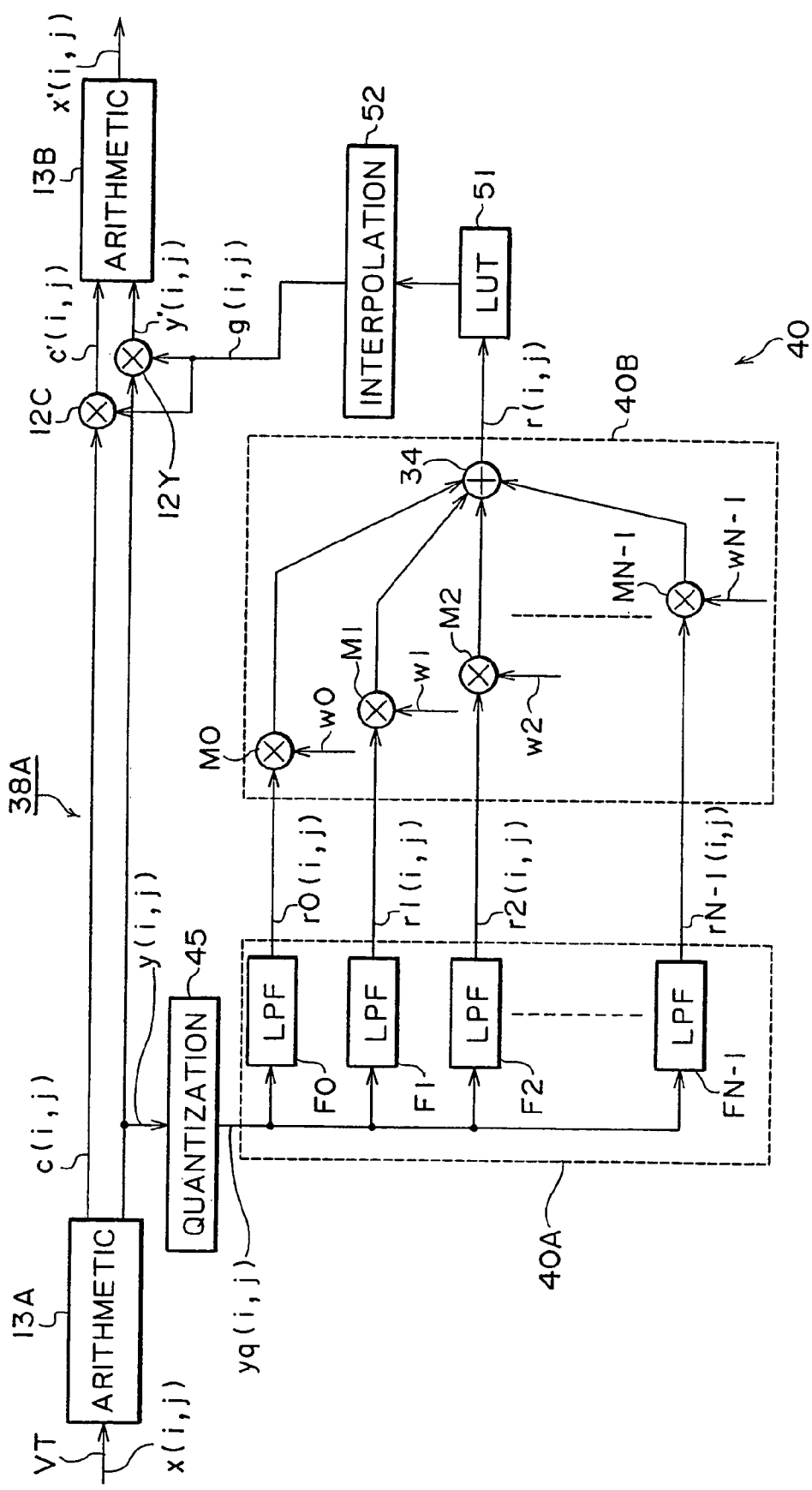
FIG. 21 is a block diagram showing a gradation correction circuit applied to a first modification to the television camera of the third embodiment of the present invention.

FIG. 21 shows a gradation correction circuit applied to a first modification to the television camera of the third embodiment described above with reference to FIG. 20. Referring to FIG. 21, the gradation correction circuit is generally denoted at 38A and applied in place of the gradation correction circuit 28A described hereinabove with reference to FIG. 19 or the gradation correction circuit 38 described above with reference to FIG. 20. The gradation correction circuit 38A includes a pair of arithmetic circuits 13A and 13B, a quantization circuit 45, an area discrimination filter 40, a lookup table 51, a interpolation circuit 52, and a pair of multiplication circuits 12C and 12Y. The arithmetic circuits 13A and 13B, quantization circuit 45, area discrimination filter 40, and multiplication circuit 12C and 12Y are similar to those described hereinabove with reference to FIG. 19, and overlapping description of them is omitted here to avoid redundancy. The gradation correction circuit 38 thus includes the lookup table 51 and the interpolation circuit 52 in place of the lookup table 41 of the gradation circuit 28A.

The interpolation circuit 52 executes interpolation arithmetic processing in accordance with the expressions (24) given hereinabove using addresses addr0 (i, j), addr1 (i, j) and correction coefficients g0 (i, j), g1 (i, j) inputted thereto from the lookup table 51 and outputs a result of the interpolation as a contrast correction coefficient g(i, j).

Where the gradation correction circuit 38A shown in FIG. 21 is employed, since interpolation arithmetic processing is performed to produce a correction coefficient, a correction coefficient whose value exhibits a smooth variation can be produced using a lookup table of a comparatively small scale, and the gradation can be corrected with a higher degree of accuracy as much.

Fourth Embodiment

Figure 22:
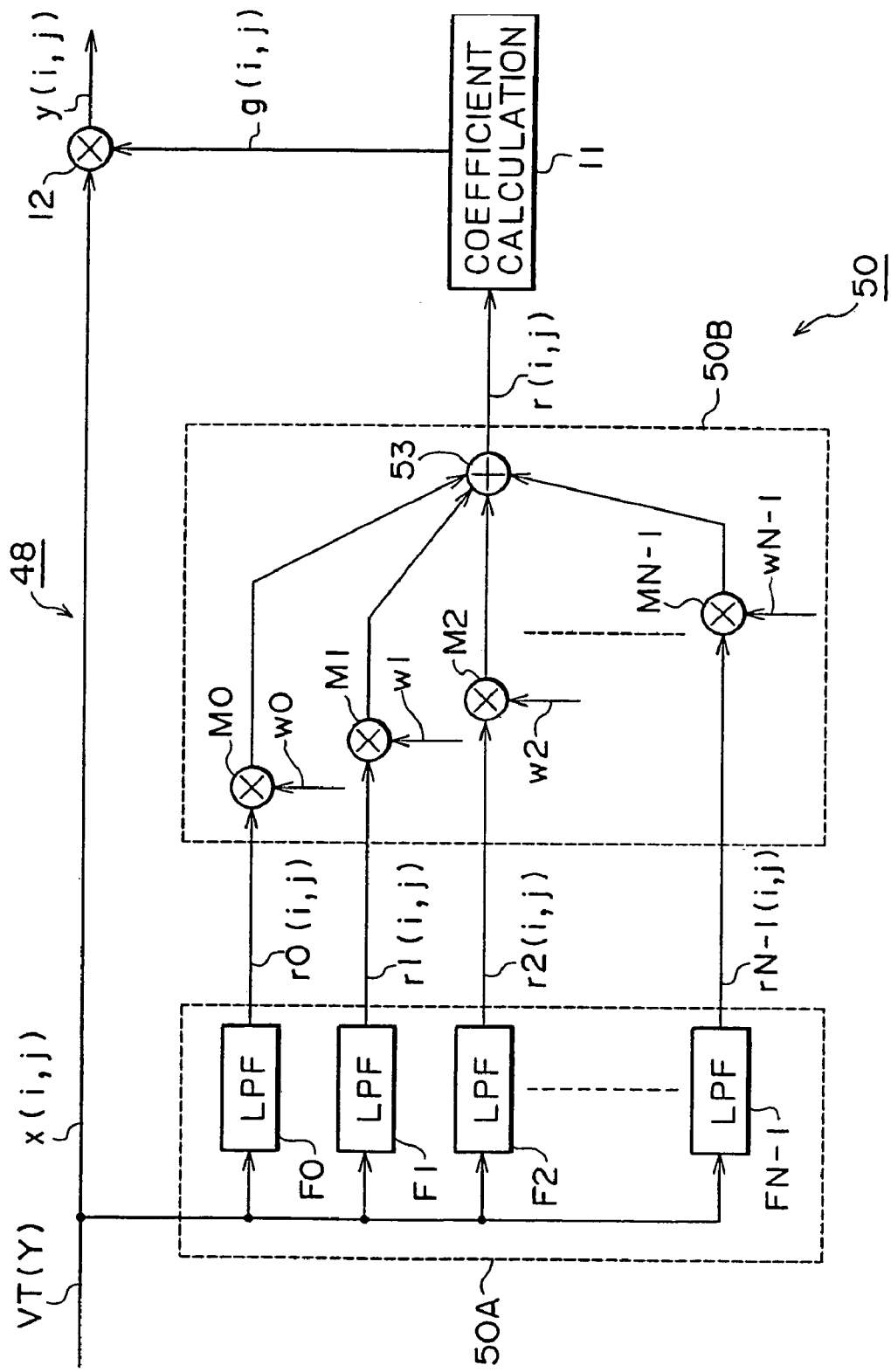
FIG. 22 is a block diagram showing a gradation correction circuit applied to a television camera according to a fourth embodiment of the present invention.

FIG. 22 is a block diagram showing a gradation correction circuit applied to a television camera according to a fourth embodiment of the present invention. The gradation correction circuit is generally denoted at gradation correction circuit 48 and is adapted in place of the gradation correction circuit 8 described hereinabove with reference to FIG. 1. The gradation correction circuit 48 includes an area discrimination filter 50, a coefficient calculation circuit 11, and a multiplication circuit 12. The coefficient calculation circuit 11 and multiplication circuit 12 are similar to those of the gradation correction circuit 8 described hereinabove with reference to FIG. 1, and overlapping description of it is omitted here to avoid redundancy.

The area discrimination filter 50 in the gradation correction circuit 48 includes a low-pass filter section 50A which discriminates an area to which input image data belongs with different resolutions to obtain and output identification signals r0(i, 1), r1(i, j), r2(i, j), ... rN−1 (i, j), and a signal composition section 50B for producing an identification result r(i, j) of a single composite signal based on the identification results r0 (i, 1), r1(i, j), r2(i, j), ... rN−1 (i, j) according to the different resolutions.

The low-pass filter section 50A is formed from low-pass filters (LPF) F0, F1, F2, ..., FN−1 having different pass-band widths. A pixel value x(i, j) of a brightness signal Y produced from an image pickup result VT is inputted to the low-pass filters F0, F1, F2, ..., FN−1, and corresponding low frequency components are outputted as identification results r0(i, j), r1(i, j), r2(i, j), rN−1 (i, j) from the low-pass filters F0, F1, F2, ..., FN−1, respectively.

The signal composition section 50B includes multiplication circuits M0, M1, M2, ..., MN−1 which receive and weight the identification results r0(i, j), r1(i, j), r2(i, j), ..., rN−1 (i, j), and an addition circuit 53 which adds the weighted identification results r0(i, j), r1(i, j), r2(i, j), ..., rN−1 (i, j) to produce a composite signal as an identification result r(i, j). The identification result r(i, j) thus obtained by the addition circuit 53 is outputted from the signal composition section 50B. It is to be noted that weighting coefficients w0, w1, w2, ..., wN−1 which are used by the multiplication circuits M0, M1, M2, ..., MN−1, respectively, are set in advance so that they may satisfy the following relational expression (26):

$$\sum_{k=0}^{N-1} wk = 1 \qquad (26)$$

Consequently, in the gradation correction circuit 48 described above, a profile provided by the image pickup result VT is not emphasized abnormally according to the setting of the weighting coefficients w0, w1, w2, ..., wN−1.

In particular, if the pixel value x(i, j) varies suddenly as seen in FIG. 23(A), then the signal level of the low frequency component r(i, j) varies so that such a sudden variation of the pixel value may be moderated. When the signal level of the low frequency component r(i, j) of the pixel value x(i, j) is displaced to the higher level side with respect to the inflection point of the characteristic described hereinabove with reference to FIG. 6, if the contrast correction coefficient g(i, j) is produced merely based on an output signal of a low-pass filter as in the television camera 1 of FIG. 10, then the pixel value is amplified with an excessively high gain immediately before the pixel value x(i, j) varies suddenly, but immediately after the pixel value x(i, j) varies suddenly, the pixel value is amplified with an excessively low gain. Consequently, an output value y(i, j) (FIG. 23(B)) which provides an abnormally amplified profile is obtained.

In this instance, such abnormal emphasis of the profile as just described can be reduced by correcting the pixel values with a substantially uniform gain.

Consequently, where the gradation correction circuit 48 shown in FIG. 22 is employed, since correction coefficients are produced from a plurality of different low frequency components, abnormal emphasis of a profile can be prevented effectively, and similar advantages to those achieved by the television camera 1 of the first embodiment described hereinabove with reference to FIG. 1 can be achieved.

First Modification to the Fourth Embodiment

Figure 24:
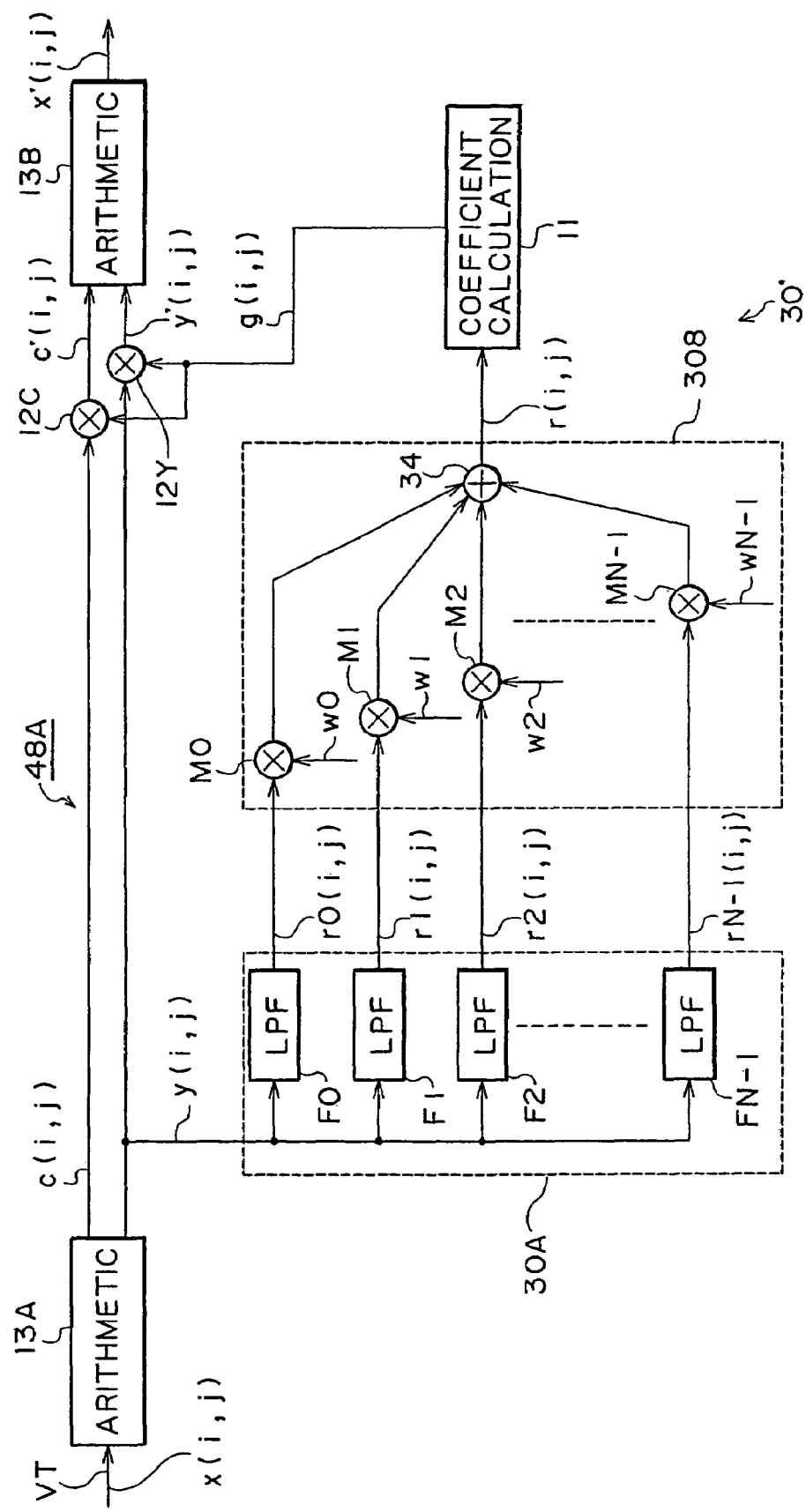
FIG. 24 is a block diagram showing a gradation correction circuit applied to a first modification to the television camera of the fourth embodiment of the present invention.

FIG. 24 shows a gradation correction circuit applied to a first modification to the television camera of the fourth embodiment shown in FIG. 22. Referring to FIG. 21, the gradation correction circuit is generally denoted at 48A and applied in place of the gradation correction circuit 8A described hereinabove with reference to FIG. 9 or the gradation correction circuit 48 described above with reference to FIG. 22. The gradation correction circuit 48A includes a pair of arithmetic circuits 13A and 13B, an area discrimination filter 30, a coefficient calculation circuit 11, and a pair of multiplication circuits 12C and 12Y. The arithmetic circuits 13A and 13B, coefficient calculation circuit 11, and multiplication circuit 12C and 12Y are similar to those described hereinabove with reference to FIG. 9 while the area discrimination filter 30 is similar to the area discrimination filter 50 described hereinabove with reference to FIG. 22, and overlapping description of them is omitted here to avoid redundancy.

Fifth Embodiment

Figure 25:
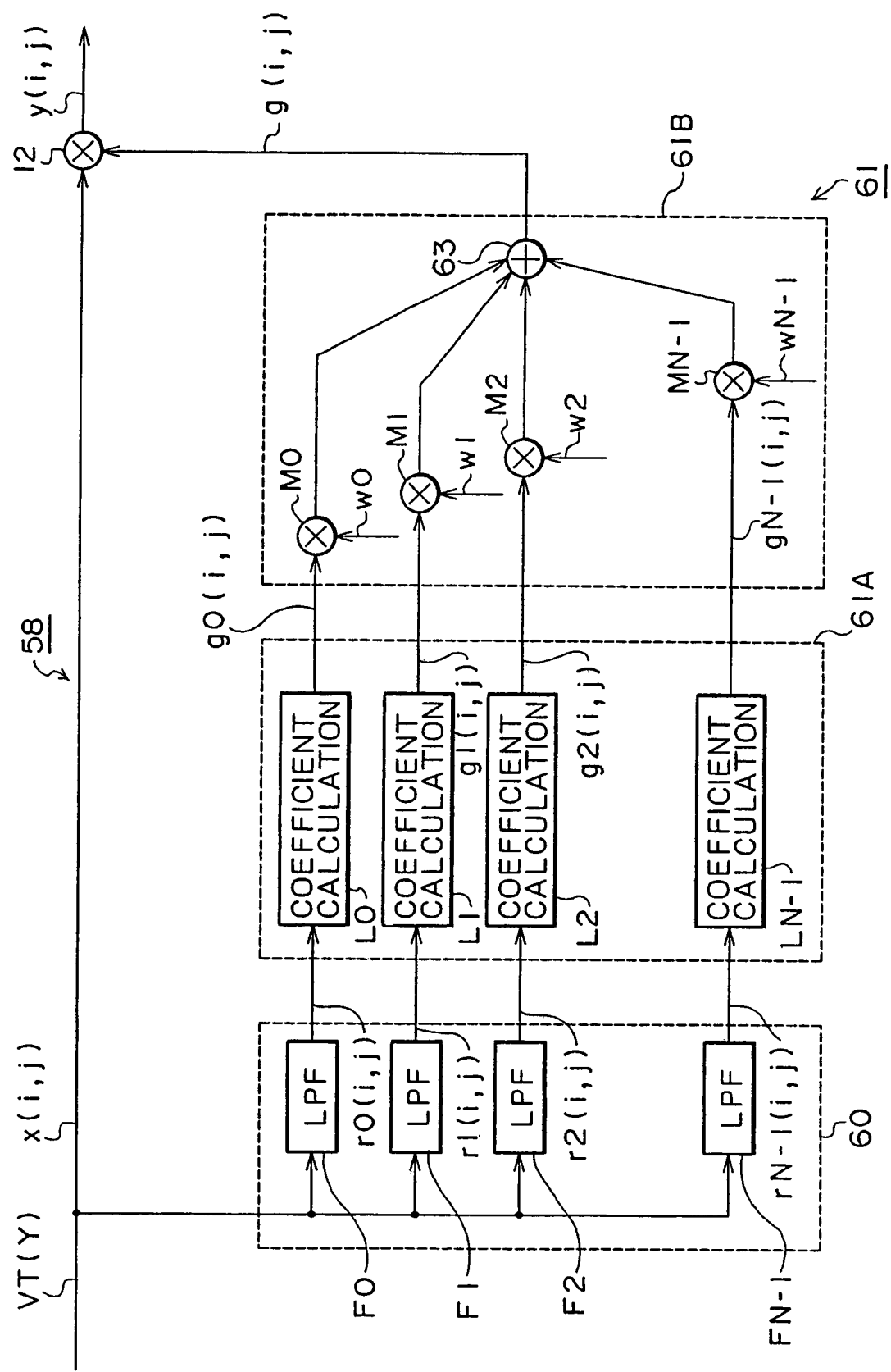
FIG. 25 is a block diagram showing a gradation correction circuit applied to a television camera according to a fifth embodiment of the present invention.

FIG. 25 is a block diagram showing a gradation correction circuit applied to a television camera according to a fifth preferred embodiment of the present invention. The gradation correction circuit is generally denoted at 58 and is adapted in place of the gradation correction circuit 8 described hereinabove with reference to FIG. 1. The gradation correction circuit 58 includes an area discrimination filter 60, a coefficient calculation circuit 61, and a multiplication circuit 12. The multiplication circuit 12 is similar to that of the gradation correction circuit 8 described hereinabove with reference to FIG. 1, and overlapping description of it is omitted here to avoid redundancy.

The area discrimination filter 60 in the gradation correction circuit 58 outputs discrimination results r0(i, j), r1(i, j), r2(i, j), ..., rN−1 (i, j) according to different resolutions. In particular, the area discrimination filter 60 is formed from low-pass filters (LPF) F0, F1, F2, ..., FN−1 having different pass-band widths. A pixel value x(i, j) is inputted to the low-pass filters F0, F1, F2, ..., FN−1, and corresponding frequency components are outputted as identification results r0(i, j), r1(i, j), r2(i, j), ..., rN−1 (i, j) from the low-pass filters F0, F1, F2, ..., FN−1, respectively.

The coefficient calculation circuit 61 includes a coefficient production section 61A for producing, from the identification results r0(i, j), r1(i, j), r2(i, j), ..., rN−1 (i, j), corresponding correction coefficients g0 (i, j), g1 (i, j), g2 (i, j), ..., gN−1 (i, j), and a coefficient composition section 61B for composing the correction coefficients g0 (i, j), g1 (i, j), g2 (i, j), ..., gN−1 (i, j) to produce a single correction coefficient g(i, j).

The coefficient production section 61A includes coefficient calculation sections L0, L1, L1, ..., LN−1 for producing, from the identification results r0(i, j), r1(i, j), r2(i, j), ..., rN−1 (i, j), corresponding correction coefficients g0 (i, j), g1 (i, j), g2(i, j), ..., gN−1 (i, j) based on predetermined coefficient calculation functions Gk (k=0, 1, 2, ..., N−1 ), respectively.

The coefficient composition section 61B includes multiplication circuits M0, M1, M2, ..., MN−1 which weight the correction coefficients g0(i, j), g1(i, j), g2(i, j), ..., gN−1(i, j), and an addition circuit 63 which adds results of the weighting by the multiplication circuits M0, M1, M2, ..., MN−1 to produce and output a single correction coefficient g(i, j). It is to be noted that weighting coefficients w0, w1, w2, ..., wN−1 used by the multiplication circuits M0, M1, M2, ..., MN−1, respectively, are set in advance so that the relational expression (11) given hereinabove may be satisfied.

Where the gradation correction circuit 58 shown in FIG. 25 is employed, correction coefficients are produced from a plurality of different low frequency components and a single correction coefficient is produced from the produced correction coefficients, and consequently, similar advantages to those achieved by the gradation correction circuit 48 described hereinabove in the forth embodiment with reference to FIG. 22 can be achieved.

First Modification to the Fifth Embodiment

Figure 26:
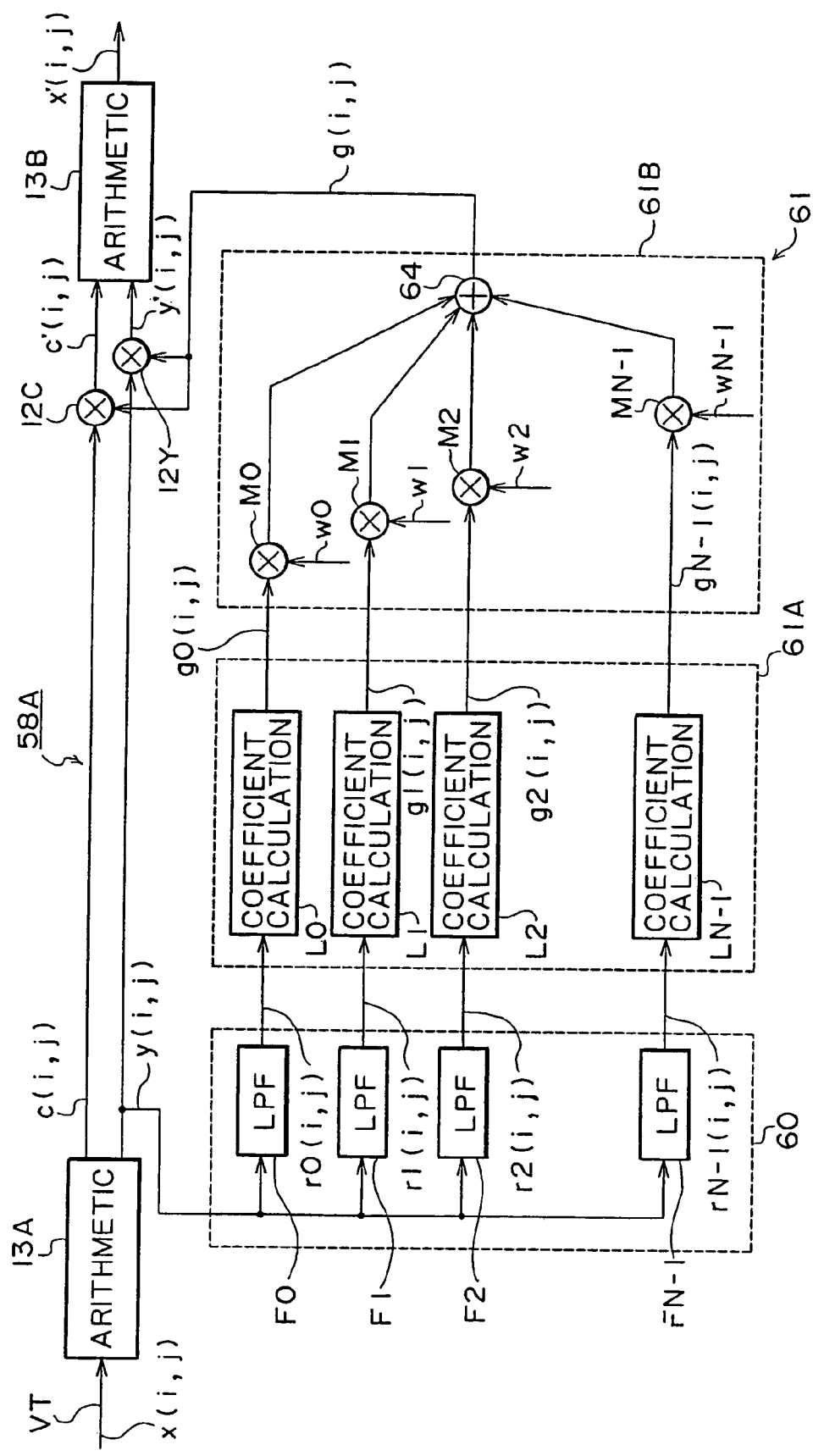
FIG. 26 is a block diagram showing a gradation correction circuit applied to a first modification to the television camera of the fifth embodiment of the present invention.

FIG. 26 shows a gradation correction circuit applied to a first modification to the television camera of the fifth embodiment shown in FIG. 25. Referring to FIG. 26, the gradation correction circuit is generally denoted at 58A and applied in place of the gradation correction circuit 8A described hereinabove with reference to FIG. 9 or the gradation correction circuit 58 described above with reference to FIG. 24. The gradation correction circuit 58A includes a pair of arithmetic circuits 13A and 13B, an area discrimination filter 60, a coefficient calculation circuit 61, and a pair of multiplication circuits 12C and 12Y. The arithmetic circuits 13A and 13B, and multiplication circuit 12C and 12Y are similar to those described hereinabove with reference to FIG. 9 while the area discrimination filter 60 and coefficient calculation circuit 61 are similar to those described hereinabove with reference to FIG. 25, and overlapping description of them is omitted here to avoid redundancy.

Sixth Embodiment

Figure 27:
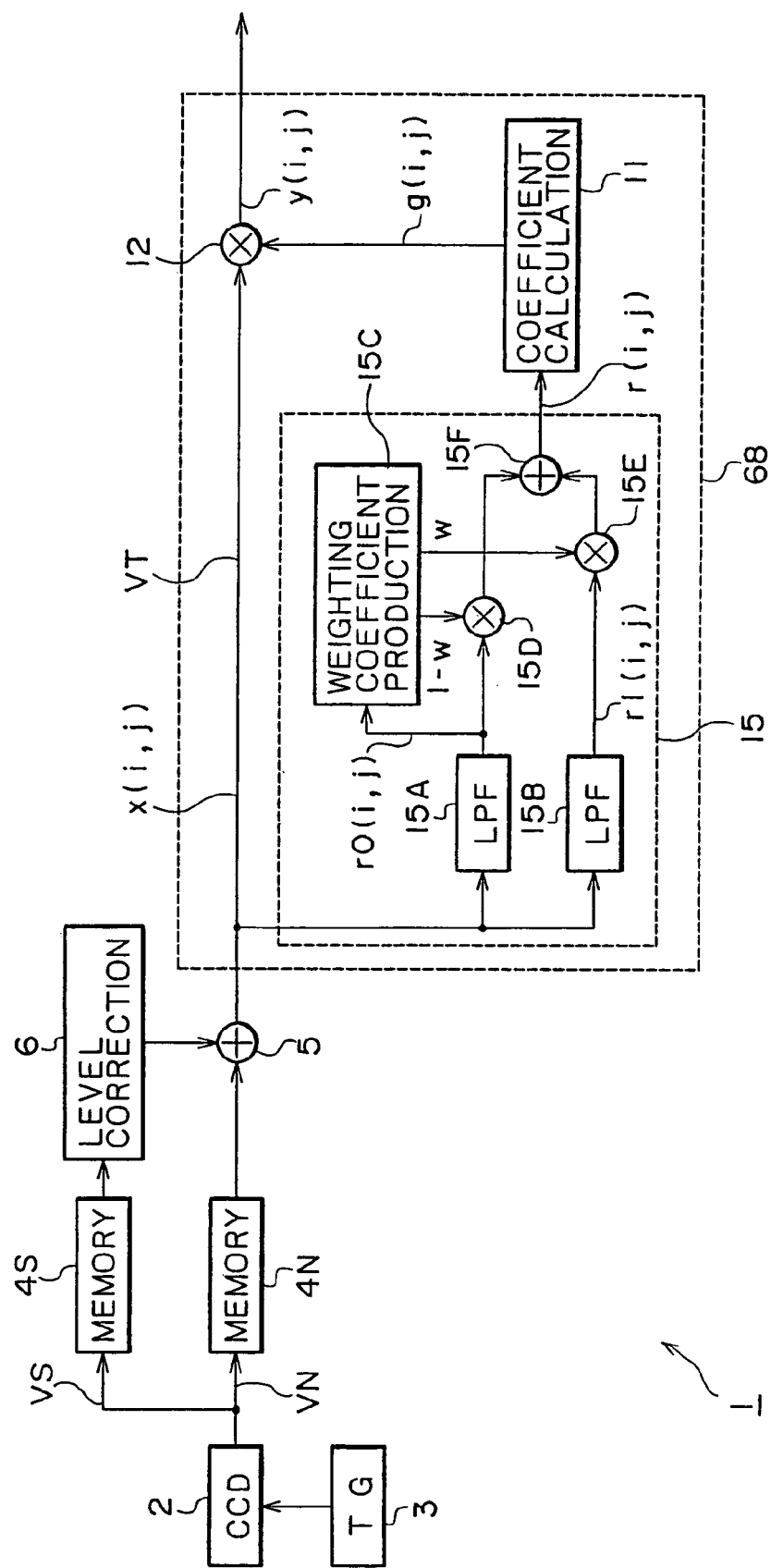
FIG. 27 is a block diagram showing a gradation correction circuit applied to a television camera according to a sixth embodiment of the present invention.

FIG. 27 is a block diagram showing a television camera according to a sixth preferred embodiment of the present invention. The television camera is generally denoted at 1 and includes a CCD solid-state image pickup device 2, a timing generator (TG) 3, a pair of memories 4S and 4N, an addition circuit 5, a level correction circuit 6, and a gradation correction circuit 68. The CCD solid-state image pickup device 2, timing generator 3, memories 4S and 4N, addition circuit 5, and level correction circuit 6 are similar to those of the television camera 1 of the first embodiment described hereinabove with reference to FIG. 1.

The gradation correction circuit 68 includes an area discrimination filter 15, a coefficient calculation circuit 11, and a multiplication circuit 12. The coefficient calculation circuit 11 and multiplication circuit 12 are similar to those of the television camera 1 of the first embodiment described hereinabove with reference to FIG. 1.

The area discrimination filter 15 in the gradation correction circuit 68 discriminates an area to which input image data belongs and outputs a result of the discrimination. To this end, the area discrimination filter 15 includes a pair of low-pass filters (LPF) 15A and 15B, a weighting coefficient production section 15C, a pair of multiplication circuits 15D and 15E, and an addition circuit 15F.

In particular, in the area discrimination filter 15, each pixel value x(i, j) of an image pickup result VT is inputted to and band limited by the low-pass filters 15A and 15B. In particular, the low-pass filters 15A and 15B of the area discrimination filter 15 discriminate to which average bright level area input image data belongs and output low frequency components r0(i, j) and r1(i, j) of results of the discrimination, respectively. Further, in this instance, the low-pass filters 15A and 15B having different pass-band widths in the area discrimination filter 15 execute the respective processes simultaneously in parallel to each other to produce low frequency components r0(i, j) and r1(i, j) which are results of the discrimination with different resolutions. It is to be noted that, in the television camera 1 of the present embodiment, in regard to the image pickup result VT inputted in the order of raster scanning, the horizontal direction is indicated by the subscript i while the vertical direction is indicated by the subscript j as seen in FIG. 5.

The weighting coefficient production section 15C produces weighting coefficients 1−w and w for the low frequency components r0(i, j) and r1(i, j) outputted from the low-pass filters 15A and 15B, respectively, by arithmetic processing in accordance with the following expressions (27) with reference to the low-pass filter 15A:

$$w = w\min \ldots D(r0(i, j)) < D\min$$

$$w = \{D(r0(i, j)) - D\min\} / (D\max - D\min) \times$$
$$(w\max - w\min) + w\min \ldots D\min \leq D(r0(i, j)) < D\max$$

$$w = w\max \ldots D\max \leq D(r0(i, j))$$

where Dmax and Dmin are constants for normalization, and wmax and wmin are a maximum value and a minimum value of a value calculated as a weighting coefficient, respectively, and a value higher than 0 but lower than 1 is provided in advance to each of the values wmax and wmin. The function D(L) is a function which depends upon the coefficient calculation function G used by the succeeding coefficient calculation circuit 11 and is defined by the following expression (28):

$$D(L) = \frac{d}{dL}(G(L) \times L) \qquad (28)$$

Consequently, the weighting coefficient production section 15C increases the value of the weighting coefficient w when the corresponding pixel value x(i, j) corresponds to a portion in which the gradient of a revel conversion function T(L) which is hereinafter described is small.

The multiplication circuits 15D and 15E weight the low frequency components r0(i, j) and r1(i, j) with the weighting coefficients 1−w and w, respectively, and the succeeding addition circuit 15F adds results of the weighting by the multiplication circuits 15D and 15E to produce and output a single area discrimination result r(i, j).

Consequently, the area discrimination filter 15 executes weighted addition processing of the following expression (29):

$$r(i, j) = (1-w) \times r0(i, j) + w \times r1(i, j) \qquad (29)$$

so that, for an area which corresponds to a portion in which the gradient of the level conversion function T(L) is large, the ratio of the low frequency component r1(i, j) which has been band limited with the higher resolution is increased to output a single area discrimination result r(i, j), but on the contrary, for another area which corresponds to a portion in which the gradient of the level conversion function T(L) is small, the ratio of the low frequency component r0(i, j) which has been band limited with the low resolution is increased to output a single area discrimination result r(i, j).

Consequently, the area discrimination filter 15 produces a discrimination result r(i, j) so that the spatial resolution may be switched in response to the pixel value x(i, j) of the image pickup result VT, that is, the spatial resolution of the discrimination result r(i, j) may be lower with a portion in which the gradient of the level conversion function T(L) which is an input/output characteristic of the coefficient calculation circuit 11 which is hereinafter described is smaller.

Consequently, an area to which input image data of the image pickup result VT is discriminated with the different resolutions and results of the discrimination are produced by the low-pass filters 15A and 15B of the area discrimination filter 15. More particularly, low frequency components r0(i, j) and r1(i, j) which indicate average brightness levels which are average values with regard to a pixel value x(i, j) are extracted by the low-pass filters 15A and 15B for the different frequency bands, and consequently, fine structures in the image are removed and areas in which pixel values are comparatively flat are extracted.

The two low frequency components $r0(i, j)$ and $r1(i, j)$ of the image pickup result VT are composed into a single low frequency component $r(i, j)$ by the weighted averaging circuit formed from the multiplication circuits 15D and 15E and the addition circuit 15F, and the low frequency component $r(i, j)$ is outputted as a discrimination result for each area.

Then, a contrast correction coefficient $g(i, j)$ is produced in accordance with the signal level of the low frequency component $r(i, j)$ of the image pickup result VT by the succeeding coefficient calculation circuit 11, and the pixel value of the result of image pickup is corrected with the contrast correction coefficient $g(i, j)$ by the multiplication circuit 12.

With the television camera 1 having the construction described above with reference to FIG. 27, since a correction coefficient is produced based on a result of discrimination of an area to which each image data belongs and an image pickup result is corrected with the correction coefficient, while the relationship in magnitude among pixel values in the same area is maintained because the same coefficient is used, pixel values which belong to different areas can be made nearer to each other in accordance with the necessity, and in an extreme case, the relationship can be reversed. Consequently, the gradation can be corrected while preventing partial deterioration of the contrast.

In this instance, if the discrimination results according to the different resolutions are composed such that a correction coefficient for a comparatively low resolution is allocated to a value area formed from a level with which the gradient of the level conversion curve is small whereas another correction coefficient for a comparatively high resolution is allocated to another area formed from a level with which the gradient of the level conversion curve is great, then a natural contrast can be assured also between adjacent areas, and the gradation can be corrected further naturally.

First Modification to the Sixth Embodiment

Figure 28:
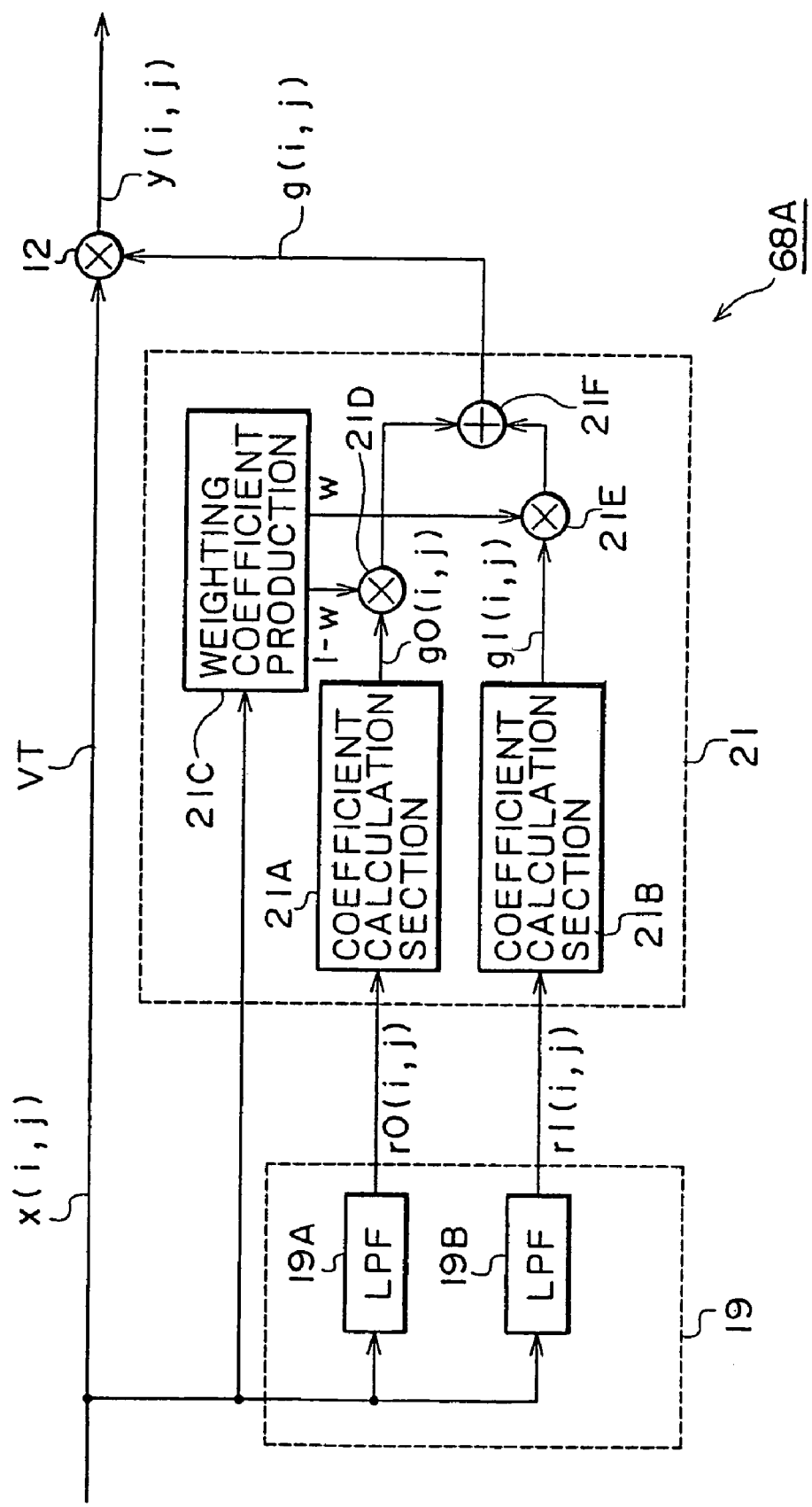
FIG. 28 is a block diagram showing a gradation correction circuit applied to a first modification to the television camera of the sixth embodiment of the present invention.

FIG. 28 shows a gradation correction circuit applied to a first modification to the television camera 1 of the sixth embodiment shown in FIG. 27. Referring to FIG. 28, the gradation correction circuit is generally denoted at 68A and applied in place of the gradation correction circuit 68 described hereinabove with reference to FIG. 27. The gradation correction circuit 68A includes an area discrimination filter 19, a coefficient calculation circuit 21, and a multiplication circuit 12. The multiplication circuit 12 is similar to that described hereinabove with reference to FIG. 27, and overlapping description of it is omitted here to avoid redundancy.

The area discrimination filter 19 in the gradation correction circuit 68A outputs discrimination results $r0(i, j)$ and $r1(i, j)$ obtained by discriminating an area to which a pixel value $x(i, j)$ belongs with different resolutions.

In particular, the area discrimination filter 19 includes a pair of low-pass filters (LPF) 19A and 19B having different pass-band widths. A pixel value $x(i, j)$ is provided to the low-pass filters 19A and 19B, and corresponding low frequency components are outputted as discrimination results $r0(i, j)$ and $r1(i, j)$ from the low-pass filters 19A and 19B, respectively.

The low-pass filters 19A and 19B are formed similarly to the low-pass filters 15A and 15B described hereinabove with reference to FIG. 27, respectively.

The coefficient calculation circuit 21 includes a pair of coefficient calculation sections 21A and 21B, a weighting coefficient production section 21C, a pair of multiplication circuits 21D and 21E, and an addition circuit 21F, and produces, from the discrimination results $r0(i, j)$, $r1(i, j)$, corresponding correction coefficients $g0(i, j)$, $g1(i, j)$ and composes the two correction coefficients $g0(i, j)$, $g1(i, j)$ to produce a single contrast correction coefficient $g(i, j)$.

In particular, the coefficient calculation sections 21A and 21B in the coefficient calculation circuit 21 produce correction coefficients $g0(i, j)$, $g1(i, j)$ from the discrimination results $r0(i, j)$, $r1(i, j)$ based on respective predetermined coefficient calculation functions Gk (k=0, 1) and outputs the thus produced correction coefficients $g0(i, j)$, $g1(i, j)$.

The weighting coefficient production section 21C executes arithmetic processing similar to that executed with regard to the expression (4) given hereinabove with reference to a pixel value $x(i, j)$ of the image pickup result VT. Thus, the coefficient production circuit 21C reduces the value of the weighting coefficient w when the pixel value $x(i,j)$ corresponds to an area in which the gradient of the level conversion function is small.

The multiplication circuits 21D and 21E weight the correction coefficients $g0(i, j)$, $g1(i, j)$ with the weighting coefficients 1−w and w, respectively, and the succeeding addition circuit 21F adds results of the weighting by the multiplication circuits 21D and 21E to produce a single correction coefficient $g(i, j)$ and outputs the correction coefficient $g(i, j)$.

Consequently, the coefficient calculation circuit 21 operates the correction coefficients $g0(i, j)$, $g1(i, j)$ in response to the pixel value $x(i, j)$ to switch the spatial resolution of the correction coefficient $g(i, j)$.

In particular, the coefficient calculation circuit 21 produces the contrast correction coefficient $g(i, j)$ so that the spatial resolution of the correction coefficient $g(i, j)$ may be lower with a portion in which the gradient of the level conversion function which is an input/output characteristic of the multiplication circuit 12 is smaller.

More specifically, the coefficient calculation circuit 21 increases, for an area which corresponds to a portion in which the gradient of the level conversion function T(L) is large, the ratio of the correction coefficient $g1(I, j)$ generated by the low frequency component $r1(i, j)$ which has been band limited with the higher resolution to output a single correction coefficient $g(i, j)$, but increases, on the contrary, for another area which corresponds to a portion in which the gradient of the level conversion function T(L) is small, the ratio of the correction coefficient $g0(i, j)$ generated by the low frequency component $r0(i, j)$ which has been band limited with the low resolution to output a single correction coefficient $g(i, j)$.

Where the gradation correction circuit 68A having the construction described above with reference to FIG. 28 is employed, since correction coefficients according to different resolutions are produced and composed into a single correction coefficient and the gradation is corrected with the correction coefficient, advantages similar to those achieved by the television camera according to the sixth embodiment of the present invention can be achieved.

Other Forms

Figure 29:
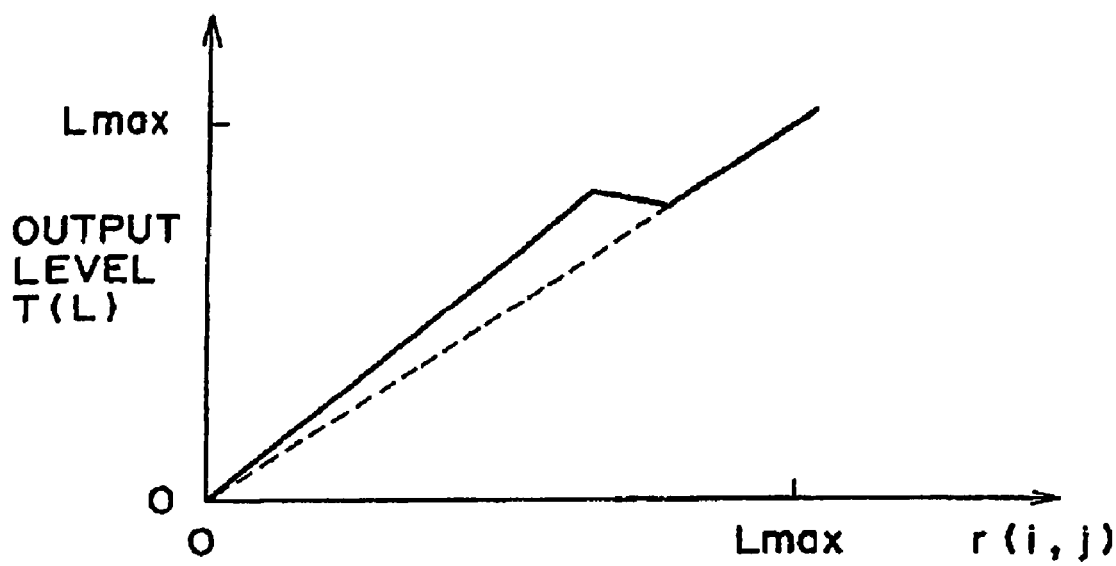
FIG. 29 is a characteristic diagram illustrating a level conversion function applied to a gradation correction circuit applied to a television camera according to a different embodiment of the present invention.

It is to be noted that, while, in all of the embodiments described above, a correction coefficient is produced basically with a characteristic described hereinabove with reference to FIG. 6, the present invention is not limited to this, and a correction coefficient may be produced with any of various input/output characteristics. For example, a level conversion function may be used which provides such an input/output characteristic wherein the output level decreases intermediately as the input level increases as seen in FIG. 29.

In particular, according to a conventional technique, where such a function as described above is used, since it is not a monotone increasing function, a false profile sometimes appears on an image of a result of processing. However, where image data are divided into different areas by means of low-pass filters and processing is performed for the image data of the different areas as in the embodiments described hereinabove, such a large variation of a pixel value that causes reversal of a relationship in magnitude between pixel values can be prevented within each neighboring area of a magnitude corresponding to the pass band of the corresponding filter. Consequently, appearance of a false profile can be prevented effectively.

Further, while, in the embodiments described above, a coefficient calculation function G is produced by arithmetic processing of the expression (6) using the level conversion function T, the present invention is not limited to this, and the coefficient calculation function G may be set arbitrarily without using the level conversion function T.

Furthermore, while, in the embodiments described above, a gradation is corrected by a gradation correction circuit and then the dynamic range is suppressed by a succeeding signal processing circuit, the present invention is not limited to this, and such processes may be executed collectively in accordance with the setting of the level conversion function T and the corresponding coefficient calculation function G.

In particular, in the process of suppressing the dynamic range, it is required that the number of bits of a pixel value to be outputted be smaller than the number of bits of a pixel value inputted, and the processes described above can be executed collectively by setting the maximum value of the output level to a maximum value permitted to an output image in the level conversion function T and producing a coefficient calculation function G using the maximum value thus set.

Where the coefficient calculation function G is set arbitrarily without using the level conversion function T, the coefficient calculation function G should be set so as to satisfy the following expressions (30):

$$L \times G(L) \leq LOmax$$
$$0 \leq L \leq Lmax \quad (30)$$

where L is the input pixel level, Lmax is the maximum value of the input pixel level, and LOmax is the maximum value of the output pixel level.

Further, while, in the second to the sixth embodiments described above, a quantization circuit, a lookup table and an interpolation circuit are used, the present invention is not limited to this, and all or some of a quantization circuit, a lookup table and an interpolation circuit may be applied if necessary to the apparatus other than the second to sixth embodiments.

Or conversely, a quantization circuit may be omitted if necessary from the second to sixth embodiments.

Furthermore, while, in the embodiments described above, a brightness signal is produced from a color signal and the gradation of the color signal is corrected with reference to the brightness signal, the present invention is not limited to this and can be applied widely to a case wherein an image pickup result (FIG. 3) wherein an amplitude modulated color signal is superposed on a brightness signal outputted from a solid-state image pickup device of the single plate type is processed based on, for example, such setting of a color filter as shown in FIG. 2, another case wherein a video signal composed of a brightness signal and a color difference signal is processed, a further case wherein a composite video signal wherein a chroma signal is superposed on a brightness signal is processed, and so forth.

It is to be noted that, for example, where an image pickup result wherein an amplitude modulated color signal is superposed on a brightness signal is processed, the gradation can be corrected while preventing color noise effectively by setting the resolution of the correction coefficient lower than the modulation frequency of the color signal.

Where a video signal composed of a brightness signal and a color difference signal is processed, the gradation of the video signal can be corrected by calculating a correction coefficient based on the brightness signal and correcting the gradations of the brightness signal and the color difference signal with the correction coefficient.

Further, while, in the embodiments described above, an area to which each input image data belongs is discriminated with low-pass filters and low frequency components outputted from the low-pass filters are used as a discrimination result, the present invention is not limited to this, and similar advantages to those of the embodiments described above can be achieved also by dividing a processing object image into several areas with various characteristic amounts using various processing methods such as, for example, by grasping the similarity between a pixel selected arbitrarily from an image of a processing object and neighboring pixels around the pixel, expanding the area successively from the pixel to divide the processing object area into several areas and then using the characteristic amount as a discrimination result.

Furthermore, while, in the embodiments described above, the present invention is applied to a television camera, the present invention is not limited to this and can be applied widely to various image processing apparatus such as a television receiver, a video tape recorder and a printer.

As described above, according to the present invention, since an area to which each input image data belongs is discriminated, for example, with reference to a low frequency component of a pixel value and the signal level of the image data is corrected based on a result of the discrimination, the gradation can be corrected while preventing partial deterioration of the contrast effectively.

Further, since brightness data is demultiplexed from image data and a correction coefficient is produced based on a result of discrimination of an area to which the brightness data belongs and then used for correction of the pixel value, the gradation can be corrected while preventing partial deterioration of the contrast effectively.

Furthermore, since a characteristic amount representative of a characteristic of a predetermined range neighboring to each pixel is detected and an area to which the input image data belongs is discriminated based on the characteristic amount and then a correction coefficient is produced based on a result of the discrimination and used for correction of the pixel value, where an output signal of, for example, a solid-state image pickup device of the single plate type is selected as a processing object, the gradation can be corrected while preventing partial deterioration of the contrast effectively.

Besides, since, when a correction coefficient is produced based on a discrimination result of an area to which input image data belongs and a pixel value is corrected with the correction coefficient, the operation is switched such that the spatial resolution of the corresponding correction coefficient may be switched in response to the pixel value of the image data, the gradation can be corrected while preventing partial deterioration of the contrast effectively, and in this instance, a natural contrast can be assured also between adjacent areas.

While preferred embodiments of the present invention have been described using specific terms, such description is for illustrative purposes only, and it is to be understood that changes and variations may be made without departing from the spirit or scope of the following claims.

What is claimed is:

1. An image processing apparatus capable of correcting the gradation of image data, comprising:
   brightness data separation means for separating brightness data and color data from the image data;
   area discrimination means for discriminating areas to which the image data belong and outputting discrimination results;
   coefficient calculation means for outputting correction coefficients to be used for correction of pixel values of the brightness data based on the discrimination results; and
   correction means for correcting the pixel values of the brightness data and the color data with the correction coefficients; wherein
   the coefficient calculation means sets the correction coefficients at a fixed value when a signal level of the discrimination results is less than or equal to a prescribed value, and the coefficient calculation means sets the correction coefficients at a value less than the fixed value when the signal level of the discrimination results is greater than the prescribed value.

2. An image processing apparatus according to claim 1, wherein the area discrimination means detects a characteristic amount indicative of a characteristic of a predetermined range neighboring to each of the brightness data and outputting the discrimination results determined according to the characteristic amount.

3. An image processing apparatus according to claim 1, wherein the area discrimination means includes a low-pass filter for extracting a low frequency component of each of the brightness data.

4. An image processing apparatus according to claim 1, wherein the area discrimination means includes quantization means for quantizing the brightness data, and a low-pass filter for extracting a low frequency component from each of the brightness data quantized by the quantization means.

5. An image processing apparatus according to claim 1, wherein the area discrimination means includes a plurality of low-pass filters for individually extracting low frequency components of each of the brightness data, and signal composition means for producing single composite signals based on the low frequency components outputted from the low-pass filters.

6. An image processing apparatus according to claim 5, wherein the signal composition means weighted averages the low frequency components outputted from the low-pass filters to produce the composite signals.

7. An image processing apparatus according to claim 5, wherein the signal composition means weighted adds the low frequency components outputted from the low-pass filters with weighting coefficients set in advance to produce the composite signals.

8. An image processing apparatus according to claim 1, wherein the area discrimination means includes a plurality of low-pass filters for individually extracting low frequency components of the brightness data, and the coefficient calculation means includes partial coefficient calculation means for producing coefficients for correction from the low frequency components outputted from the low-pass filters.

9. An image processing apparatus according to claim 8, wherein the coefficient composition means weighted adds the coefficients for correction to produce the correction coefficients.

10. An image processing apparatus according to claim 8, wherein the coefficient composition means weighted adds the coefficients for correction with weighting coefficients set in advance to produce the correction coefficients.

11. An image processing apparatus according to claim 1, wherein the correction means multiplies the pixel values of the brightness data and the color data by the correction coefficients to correct the pixel values of the image data.

12. An image processing apparatus according to claim 1, wherein the number of bits of the brightness data outputted from the correction means is smaller than the number of bits of the image data.

13. An image processing apparatus according to claim 1, wherein the image data are data obtained by sampling a signal, wherein the amplitude modulated color signal is sequentially superposed on the brightness signal, with a predetermined frequency.

14. An image processing method for correcting the gradation of image data, comprising:
   separating brightness data and color data from the image data;
   discriminating areas to which the image data belong and outputting discrimination results;
   setting correction coefficients at a fixed value when a signal level of the discrimination results is less than or equal to a prescribed value;
   setting the correction coefficients at a value less than the fixed value when the signal level of the discrimination results is greater than the prescribed value;
   outputting the correction coefficients to be used for correction of pixel values of the brightness data based on the discrimination results; and
   correcting the pixel values of the brightness data and the color data with the correction coefficients.

15. An image processing method according to claim 14, wherein discriminating areas further comprises detecting a characteristic amount indicative of a characteristic of a predetermined range neighboring to each of the brightness data and outputting the discrimination results determined according to the characteristic amount.

16. An image processing method according to claim 14, wherein discriminating areas further comprises extracting a low frequency component of the brightness data.

17. An image processing method according to claim 14, wherein discriminating areas further comprises quantizing the brightness data, and extracting a low frequency component from the quantized brightness data.

18. An image processing method according to claim 14, wherein discriminating areas further comprises extracting a plurality of low frequency components of the brightness data with different frequency bands, and producing single composite signals based on the low frequency components.

19. An image processing method according to claim 18, further comprising weighted averaging the low frequency components to produce the composite signals.

20. An image processing method according to claim 18, further comprising weighted adding the low frequency components to weighting coefficients set in advance to produce the composite signals.

21. An image processing method according to claim 14, wherein discriminating areas further comprises extracting a plurality of low frequency components of each of the brightness data with different frequency bands.

22. An image processing method according to claim 21, further comprising weighted averaging the coefficients for correction to produce the correction coefficients.

23. An image processing method according to claim 21, further comprising weighted adding the coefficients for correction with weighting coefficients set in advance to produce the correction coefficients.

24. An image processing method according to claim 14, wherein correcting the pixel values comprises multiplying the pixel values of the brightness data and the color data by the correction coefficients to correct the pixel values of the image data.

25. An image processing method according to claim 14, wherein the number of bits of the corrected brightness data is smaller than the number of bits of the image data.

26. An image processing method according to claim 14, wherein the image data are data obtained by sampling a signal, wherein the amplitude modulated color signal is sequentially superposed on the brightness signal, with a predetermined frequency.

* * * * *